United States Patent
Klosterman et al.

(10) Patent No.: US 7,421,724 B2
(45) Date of Patent: *Sep. 2, 2008

(54) SYSTEMS AND METHODS FOR DISPLAYING INFORMATION REGIONS IN AN INTERACTIVE ELECTRONIC PROGRAM GUIDE

(75) Inventors: Brian Lee Klosterman, San Ramon, CA (US); Steven Schein, Menlo Park, CA (US)

(73) Assignee: StarSight Telecast Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/251,670

(22) Filed: Sep. 20, 2002

(65) Prior Publication Data

US 2003/0051241 A1    Mar. 13, 2003

Related U.S. Application Data

(63) Continuation of application No. 08/846,802, filed on Apr. 30, 1997, now Pat. No. 6,469,753.

(60) Provisional application No. 60/032,038, filed on Nov. 26, 1996, provisional application No. 60/016,871, filed on May 3, 1996.

(51) Int. Cl.
*G06F 3/00* (2006.01)
*G06F 13/00* (2006.01)
*H04N 5/445* (2006.01)

(52) U.S. Cl. ............................ 725/42; 725/43; 725/51; 725/58

(58) Field of Classification Search ............. 725/40–43, 725/51, 58
See application file for complete search history.

(56) References Cited

U.S. PATENT DOCUMENTS

| | | | |
|---|---|---|---|
| 3,440,427 A | 4/1969 | Kammer |
| 3,492,577 A | 1/1970 | Reiter et al. |
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |

(Continued)

FOREIGN PATENT DOCUMENTS

AU    56198/98    7/1998

(Continued)

OTHER PUBLICATIONS

"PCT Notification of Transmittal of International Preliminary Examination Report," International Application No. PCT/US97/07499, Feb. 12, 1999, pp. 1-10.

(Continued)

*Primary Examiner*—Hunter B. Lonsberry
(74) *Attorney, Agent, or Firm*—Ropes & Gray LLP; Gail C. Gotfried

(57) ABSTRACT

A system and method for displaying an electronic program schedule guide is provided. The system has areas for displaying program schedule information. In addition, the system also has areas that may be used for advertising programs, products or services. In another embodiment, the system has areas for displaying messages to the user.

41 Claims, 27 Drawing Sheets

U.S. PATENT DOCUMENTS

| | | |
|---|---|---|
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |

| | | | | | |
|---|---|---|---|---|---|
| 4,995,078 A | 2/1991 | Monslow et al. | 5,351,075 A | 9/1994 | Herz et al. |
| 4,996,642 A | 2/1991 | Hey | 5,353,121 A | 10/1994 | Young et al. |
| 4,998,171 A | 3/1991 | Kim et al. | 5,357,276 A | 10/1994 | Banker et al. |
| 5,008,853 A | 4/1991 | Bly et al. | 5,359,367 A | 10/1994 | Stockill |
| 5,014,125 A | 5/1991 | Pocock et al. | 5,359,601 A | 10/1994 | Wasilewski et al. |
| 5,027,400 A | 6/1991 | Baji et al. | 5,367,316 A | 11/1994 | Ikezaki |
| 5,036,314 A | 7/1991 | Barillari et al. | 5,367,330 A | 11/1994 | Haave et al. |
| 5,038,211 A | 8/1991 | Hallenback | 5,373,288 A | 12/1994 | Blahut |
| 5,045,947 A | 9/1991 | Beery | 5,374,951 A | 12/1994 | Welsh |
| 5,047,867 A | 9/1991 | Strubbe et al. | 5,377,317 A | 12/1994 | Bates et al. |
| 5,058,160 A | 10/1991 | Banker et al. | 5,377,319 A | 12/1994 | Kitahara et al. |
| 5,062,060 A | 10/1991 | Kolnick | 5,382,983 A | 1/1995 | Kwoh et al. |
| 5,068,734 A | 11/1991 | Beery | 5,384,910 A | 1/1995 | Torres |
| 5,072,412 A | 12/1991 | Henderson, Jr. et al. | 5,387,945 A | 2/1995 | Takeuchi |
| 5,091,785 A | 2/1992 | Canfield et al. | 5,398,074 A | 3/1995 | Duffield et al. |
| 5,093,921 A | 3/1992 | Bevins, Jr. | 5,404,393 A | 4/1995 | Remillard |
| 5,099,319 A | 3/1992 | Esch et al. | 5,410,326 A | 4/1995 | Goldstein |
| 5,103,314 A | 4/1992 | Keenan | 5,410,343 A | 4/1995 | Coddington et al. |
| 5,105,184 A | 4/1992 | Pirani et al. | 5,410,344 A | 4/1995 | Graves et al. |
| 5,119,188 A | 6/1992 | McCalley et al. | 5,410,367 A | 4/1995 | Zahavi et al. |
| 5,121,476 A | 6/1992 | Yee | 5,412,720 A | 5/1995 | Hoarty |
| 5,126,851 A | 6/1992 | Yoshimura | 5,416,508 A | 5/1995 | Sakuma et al. |
| 5,148,154 A | 9/1992 | Mackay et al. | 5,424,770 A | 6/1995 | Schmelzer et al. |
| 5,151,782 A | 9/1992 | Ferraro | 5,425,101 A | 6/1995 | Woo et al. |
| 5,151,789 A | 9/1992 | Young | 5,432,561 A | 7/1995 | Strubbe |
| 5,155,591 A | 10/1992 | Wachob | 5,434,626 A | 7/1995 | Hayashi et al. |
| 5,155,806 A | 10/1992 | Hoeber et al. | 5,446,919 A | 8/1995 | Wilkins |
| 5,157,768 A | 10/1992 | Hoeber et al. | 5,452,012 A | 9/1995 | Saitoh |
| 5,161,023 A | 11/1992 | Keenan | 5,459,522 A | 10/1995 | Pint |
| 5,162,905 A | 11/1992 | Itoh et al. | 5,461,415 A | 10/1995 | Wolf et al. |
| 5,170,388 A | 12/1992 | Endoh et al. | 5,465,113 A | 11/1995 | Gilboy |
| 5,172,111 A | 12/1992 | Olivo, Jr. | 5,465,385 A | 11/1995 | Ohga et al. |
| 5,177,604 A | 1/1993 | Martinez | 5,469,206 A | 11/1995 | Strubbe et al. |
| 5,179,654 A | 1/1993 | Richards et al. | 5,477,262 A | 12/1995 | Banker et al. |
| 5,195,092 A | 3/1993 | Wilson et al. | 5,479,266 A | 12/1995 | Young et al. |
| 5,200,823 A | 4/1993 | Yoneda et al. | 5,479,268 A | 12/1995 | Young et al. |
| 5,204,897 A | 4/1993 | Wyman | 5,479,497 A | 12/1995 | Kovarik |
| 5,206,722 A | 4/1993 | Kwan | 5,481,296 A | 1/1996 | Cragun et al. |
| 5,210,611 A | 5/1993 | Yee et al. | 5,483,278 A | 1/1996 | Strubbe et al. |
| 5,212,553 A | 5/1993 | Maruoka | 5,485,197 A | 1/1996 | Hoarty |
| 5,214,622 A | 5/1993 | Nemoto et al. | 5,485,219 A | 1/1996 | Woo |
| 5,216,515 A | 6/1993 | Steele et al. | 5,485,221 A | 1/1996 | Banker et al. |
| 5,220,420 A | 6/1993 | Hoarty et al. | 5,488,409 A | 1/1996 | Yuen et al. |
| 5,223,924 A | 6/1993 | Strubbe | 5,495,295 A | 2/1996 | Long |
| 5,227,874 A | 7/1993 | Von Kohorn | 5,502,504 A | 3/1996 | Marshall et al. |
| 5,231,493 A | 7/1993 | Apitz | 5,515,098 A | 5/1996 | Carles |
| RE34,340 E | 8/1993 | Freeman | 5,523,794 A | 6/1996 | Mankovitz et al. |
| 5,233,423 A | 8/1993 | Jernigan et al. | 5,523,796 A | 6/1996 | Marshall et al. |
| 5,233,654 A | 8/1993 | Harvey et al. | 5,524,195 A | 6/1996 | Clanton, III et al. |
| 5,235,415 A | 8/1993 | Bonicel et al. | 5,526,034 A | 6/1996 | Hoarty et al. |
| 5,236,199 A | 8/1993 | Thompson, Jr. | 5,528,304 A | 6/1996 | Cherrick et al. |
| 5,237,411 A | 8/1993 | Fink et al. | 5,532,735 A | 7/1996 | Blahut et al. |
| 5,237,417 A | 8/1993 | Hayashi et al. | 5,532,754 A | 7/1996 | Young et al. |
| 5,239,540 A | 8/1993 | Rovira et al. | 5,534,911 A | 7/1996 | Levitan |
| 5,245,420 A | 9/1993 | Harney et al. | 5,537,141 A | 7/1996 | Harper et al. |
| 5,247,347 A | 9/1993 | Litteral et al. | 5,539,822 A | 7/1996 | Lett |
| 5,247,364 A | 9/1993 | Banker et al. | 5,541,662 A | 7/1996 | Adams et al. |
| 5,253,066 A | 10/1993 | Vogel | 5,541,738 A | 7/1996 | Mankovitz |
| 5,253,067 A | 10/1993 | Chaney et al. | 5,550,576 A | 8/1996 | Klosterman |
| 5,260,778 A | 11/1993 | Kauffman et al. | 5,557,338 A | 9/1996 | Maze et al. |
| 5,260,999 A | 11/1993 | Wyman | 5,557,721 A | 9/1996 | Fite et al. |
| 5,283,639 A | 2/1994 | Esch et al. | 5,559,548 A | 9/1996 | Davis et al. |
| 5,283,819 A | 2/1994 | Glick et al. | 5,559,549 A | 9/1996 | Hendricks et al. |
| 5,301,028 A | 4/1994 | Banker et al. | 5,559,550 A | 9/1996 | Mankovitz |
| 5,311,423 A | 5/1994 | Clark | 5,559,942 A | 9/1996 | Gough et al. |
| 5,319,445 A | 6/1994 | Fitts | 5,561,471 A | 10/1996 | Kim et al. |
| 5,323,234 A | 6/1994 | Kawasaki | 5,570,295 A | 10/1996 | Isenberg et al. |
| 5,323,240 A | 6/1994 | Amano et al. | 5,572,442 A | 11/1996 | Schulhof et al. |
| 5,325,183 A | 6/1994 | Rhee | 5,574,962 A | 11/1996 | Fardeau et al. |
| 5,325,423 A | 6/1994 | Lewis | 5,579,055 A | 11/1996 | Hamilton et al. |
| 5,335,277 A | 8/1994 | Harvey et al. | 5,581,479 A | 12/1996 | McLaughlin et al. |
| 5,343,239 A | 8/1994 | Lappington et al. | 5,582,364 A | 12/1996 | Trulin et al. |
| 5,347,167 A | 9/1994 | Singh | 5,583,560 A | 12/1996 | Florin et al. |

| | | | | | | |
|---|---|---|---|---|---|---|
| 5,583,563 A | 12/1996 | Wanderscheid et al. | | 5,717,452 A | 2/1998 | Janin et al. |
| 5,585,838 A | 12/1996 | Lawler et al. | | 5,721,829 A | 2/1998 | Dunn et al. |
| 5,585,865 A | 12/1996 | Amano et al. | | 5,724,521 A | 3/1998 | Dedrick |
| 5,585,866 A | 12/1996 | Miller et al. | | 5,724,525 A | 3/1998 | Beyers et al. |
| 5,589,892 A * | 12/1996 | Knee et al. .................... 725/43 | | 5,727,060 A | 3/1998 | Young |
| 5,592,551 A | 1/1997 | Lett et al. | | 5,727,163 A | 3/1998 | Bezos |
| 5,594,509 A | 1/1997 | Florin et al. | | 5,731,844 A | 3/1998 | Rauch et al. |
| 5,596,373 A | 1/1997 | White et al. | | 5,734,444 A | 3/1998 | Yoshinobu |
| 5,600,364 A | 2/1997 | Hendricks et al. | | 5,734,853 A | 3/1998 | Hendricks et al. |
| 5,600,366 A | 2/1997 | Schulman | | 5,734,893 A | 3/1998 | Li |
| 5,600,573 A | 2/1997 | Hendricks et al. | | 5,737,028 A | 4/1998 | Bertram et al. |
| 5,602,582 A | 2/1997 | Wanderscheid et al. | | 5,737,030 A | 4/1998 | Hong et al. |
| 5,602,596 A | 2/1997 | Claussen et al. | | 5,740,549 A | 4/1998 | Reilly et al. |
| 5,602,597 A | 2/1997 | Bertram | | 5,751,282 A | 5/1998 | Girard et al. |
| 5,606,374 A | 2/1997 | Bertram | | 5,752,159 A | 5/1998 | Faust et al. |
| 5,610,653 A | 3/1997 | Abecassis | | 5,754,258 A | 5/1998 | Hanaya et al. |
| 5,617,565 A | 4/1997 | Augenbraun et al. | | 5,754,771 A | 5/1998 | Epperson et al. |
| 5,619,247 A | 4/1997 | Russo | | 5,754,939 A | 5/1998 | Herz et al. |
| 5,619,249 A | 4/1997 | Billock et al. | | 5,757,417 A | 5/1998 | Aras et al. |
| 5,619,274 A | 4/1997 | Roop et al. | | 5,758,257 A | 5/1998 | Herz et al. |
| 5,621,456 A | 4/1997 | Florin et al. | | 5,758,259 A | 5/1998 | Lawler |
| 5,623,613 A | 4/1997 | Rowe et al. | | 5,760,821 A | 6/1998 | Ellis et al. |
| 5,627,940 A | 5/1997 | Rohra et al. | | 5,761,372 A | 6/1998 | Yoshinobu et al. |
| 5,629,733 A | 5/1997 | Youman et al. | | 5,761,601 A | 6/1998 | Nemirofsky et al. |
| 5,630,119 A | 5/1997 | Aristedes et al. | | 5,768,528 A | 6/1998 | Stumm |
| 5,631,995 A | 5/1997 | Weissensteiner et al. | | 5,774,170 A | 6/1998 | Hite et al. |
| 5,635,978 A | 6/1997 | Alten et al. | | 5,774,534 A | 6/1998 | Mayer |
| 5,635,979 A | 6/1997 | Kostreski et al. | | 5,774,887 A | 6/1998 | Wolff et al. |
| 5,635,989 A | 6/1997 | Rothmuller | | 5,778,182 A | 7/1998 | Cathey et al. |
| 5,636,346 A | 6/1997 | Saxe | | 5,781,226 A | 7/1998 | Sheehan |
| 5,640,501 A | 6/1997 | Turpin | | 5,781,245 A | 7/1998 | Van Der Weij et al. |
| 5,640,577 A | 6/1997 | Scharmer | | 5,781,246 A | 7/1998 | Alten et al. |
| 5,642,153 A | 6/1997 | Chaney et al. | | 5,784,258 A | 7/1998 | Hanaya et al. |
| 5,648,813 A | 7/1997 | Tanigawa et al. | | 5,790,202 A | 8/1998 | Kummer et al. |
| 5,648,824 A | 7/1997 | Dunn et al. | | 5,790,426 A | 8/1998 | Robinson |
| 5,650,826 A | 7/1997 | Eitz | | 5,793,438 A | 8/1998 | Bedard |
| 5,650,831 A | 7/1997 | Farwell | | 5,793,964 A | 8/1998 | Rogers et al. |
| 5,652,613 A | 7/1997 | Lazarus et al. | | 5,798,785 A | 8/1998 | Hendricks et al. |
| 5,652,615 A | 7/1997 | Bryant et al. | | 5,801,747 A | 9/1998 | Bedard |
| 5,654,748 A | 8/1997 | Matthews | | 5,801,785 A | 9/1998 | Crump et al. |
| 5,654,886 A | 8/1997 | Zereski, Jr. et al. | | 5,801,787 A | 9/1998 | Schein et al. |
| 5,657,072 A | 8/1997 | Aristides et al. | | 5,802,284 A | 9/1998 | Karlton et al. |
| 5,657,091 A | 8/1997 | Bertram | | 5,805,154 A | 9/1998 | Brown |
| 5,659,350 A | 8/1997 | Hendricks et al. | | 5,805,167 A | 9/1998 | van Cruyningen |
| 5,659,366 A | 8/1997 | Kerman | | 5,805,235 A | 9/1998 | Bedard |
| 5,661,516 A | 8/1997 | Carles | | 5,805,763 A * | 9/1998 | Lawler et al. ................. 386/83 |
| 5,661,517 A | 8/1997 | Budow et al. | | 5,805,804 A | 9/1998 | Laursen et al. |
| 5,663,757 A | 9/1997 | Morales | | 5,808,608 A | 9/1998 | Young et al. |
| 5,664,111 A | 9/1997 | Nahan et al. | | 5,808,694 A | 9/1998 | Usui et al. |
| 5,666,293 A | 9/1997 | Metz | | 5,809,204 A | 9/1998 | Young et al. |
| 5,666,498 A | 9/1997 | Amro | | 5,812,205 A | 9/1998 | Milnes et al. |
| 5,666,645 A | 9/1997 | Thomas et al. | | 5,815,145 A | 9/1998 | Matthews, III |
| 5,671,276 A | 9/1997 | Eyer et al. | | 5,815,671 A | 9/1998 | Morrison |
| 5,675,390 A | 10/1997 | Schindler et al. | | 5,818,438 A | 10/1998 | Howe et al. |
| 5,675,752 A | 10/1997 | Scott et al. | | 5,818,439 A | 10/1998 | Nagasaka et al. |
| 5,677,708 A | 10/1997 | Matthews, III et al. | | 5,818,441 A | 10/1998 | Throckmorton et al. |
| 5,682,195 A | 10/1997 | Hendricks et al. | | 5,819,019 A | 10/1998 | Nelson |
| 5,682,206 A | 10/1997 | Wehmeyer et al. | | 5,819,156 A | 10/1998 | Belmont |
| 5,687,331 A | 11/1997 | Volk et al. | | 5,819,284 A | 10/1998 | Farber et al. |
| 5,689,648 A | 11/1997 | Diaz et al. | | 5,822,123 A | 10/1998 | Davis et al. |
| 5,689,666 A | 11/1997 | Berquist et al. | | 5,828,402 A | 10/1998 | Collings |
| 5,692,214 A | 11/1997 | Levine | | 5,828,420 A | 10/1998 | Marshall et al. |
| 5,694,163 A | 12/1997 | Harrison | | 5,828,839 A | 10/1998 | Moncreiff |
| 5,694,176 A | 12/1997 | Bruette et al. | | 5,828,945 A | 10/1998 | Klosterman |
| 5,694,381 A | 12/1997 | Sako | | 5,830,068 A | 11/1998 | Brenner et al. |
| 5,696,905 A | 12/1997 | Reimer et al. | | 5,838,314 A | 11/1998 | Neel et al. |
| 5,699,107 A * | 12/1997 | Lawler et al. ................. 725/58 | | 5,842,010 A | 11/1998 | Jain et al. |
| 5,699,125 A | 12/1997 | Rzeszewski et al. | | 5,842,199 A | 11/1998 | Miller et al. |
| 5,708,478 A | 1/1998 | Tognazzini | | 5,844,620 A | 12/1998 | Coleman et al. |
| 5,710,601 A | 1/1998 | Marshall et al. | | 5,848,352 A | 12/1998 | Dougherty et al. |
| 5,710,815 A | 1/1998 | Ming et al. | | 5,848,396 A | 12/1998 | Gerace |
| 5,715,314 A | 2/1998 | Payne et al. | | 5,848,397 A | 12/1998 | Marsh et al. |
| 5,715,399 A | 2/1998 | Bezos | | 5,850,218 A | 12/1998 | LaJoie et al. |

| | | | | | | |
|---|---|---|---|---|---|---|
| 5,862,292 A | 1/1999 | Kubota et al. | 6,112,186 A | 8/2000 | Bergh et al. | |
| 5,867,226 A | 2/1999 | Wehmeyer et al. | 6,115,057 A | 9/2000 | Kwoh et al. | |
| 5,867,227 A | 2/1999 | Yamaguchi | 6,118,492 A | 9/2000 | Milnes et al. | |
| 5,872,588 A | 2/1999 | Aras et al. | 6,119,098 A | 9/2000 | Guyot et al. | |
| 5,874,985 A | 2/1999 | Matthews, III | 6,125,230 A | 9/2000 | Yaginuma | |
| 5,880,768 A | 3/1999 | Lemmons et al. | 6,133,909 A | 10/2000 | Schein et al. | |
| 5,886,691 A | 3/1999 | Furuya et al. | 6,141,003 A | 10/2000 | Chor et al. | |
| 5,886,731 A | 3/1999 | Ebisawa | 6,147,714 A | 11/2000 | Terasawa et al. | |
| 5,892,498 A | 4/1999 | Marshall et al. | 6,151,059 A | 11/2000 | Schein et al. | |
| 5,892,535 A | 4/1999 | Allen et al. | 6,154,203 A | 11/2000 | Yuen et al. | |
| 5,900,905 A | 5/1999 | Shoff et al. | 6,157,413 A | 12/2000 | Hanafee et al. | |
| 5,903,314 A | 5/1999 | Niijima et al. | 6,160,545 A | 12/2000 | Eyer et al. | |
| 5,903,816 A | 5/1999 | Broadwin et al. | 6,160,546 A | 12/2000 | Thompson et al. | |
| 5,905,497 A | 5/1999 | Vaughan et al. | 6,160,570 A | 12/2000 | Sitnik | |
| 5,907,323 A | 5/1999 | Lawler et al. | 6,163,316 A | 12/2000 | Killian | |
| 5,907,366 A | 5/1999 | Farmer et al. | 6,172,677 B1 * | 1/2001 | Stautner et al. | 345/716 |
| 5,914,746 A | 6/1999 | Matthews, III et al. | 6,173,271 B1 | 1/2001 | Goodman et al. | |
| 5,917,481 A | 6/1999 | Rzeszewski et al. | 6,177,931 B1 * | 1/2001 | Alexander et al. | 725/52 |
| 5,917,830 A | 6/1999 | Chen et al. | 6,178,446 B1 | 1/2001 | Gerszberg et al. | |
| 5,918,014 A | 6/1999 | Robinson | 6,181,335 B1 | 1/2001 | Hendricks et al. | |
| 5,920,700 A | 7/1999 | Gordon et al. | 6,186,443 B1 | 2/2001 | Shaffer | |
| 5,929,849 A | 7/1999 | Kikinis | 6,191,780 B1 | 2/2001 | Martin et al. | |
| 5,929,850 A | 7/1999 | Broadwin et al. | 6,202,212 B1 | 3/2001 | Sturgeon et al. | |
| 5,936,679 A | 8/1999 | Kasahara et al. | 6,209,129 B1 | 3/2001 | Carr et al. | |
| 5,940,073 A | 8/1999 | Klosterman et al. | 6,209,130 B1 | 3/2001 | Rector, Jr. et al. | |
| 5,940,572 A | 8/1999 | Balaban et al. | 6,239,794 B1 | 5/2001 | Yuen et al. | |
| 5,945,988 A | 8/1999 | Williams et al. | 6,240,555 B1 * | 5/2001 | Shoff et al. | 725/110 |
| 5,951,642 A | 9/1999 | Onoe et al. | 6,253,203 B1 | 6/2001 | O'Flaherty et al. | |
| 5,959,688 A | 9/1999 | Schein et al. | 6,256,071 B1 | 7/2001 | Hiroi | |
| 5,960,411 A | 9/1999 | Hartman et al. | 6,256,785 B1 | 7/2001 | Klappert et al. | |
| 5,974,222 A | 10/1999 | Yuen et al. | 6,257,268 B1 | 7/2001 | Hope et al. | |
| 5,977,964 A | 11/1999 | Williams et al. | 6,262,721 B1 | 7/2001 | Tsukidate et al. | |
| 5,986,650 A | 11/1999 | Ellis et al. | 6,263,501 B1 | 7/2001 | Schein et al. | |
| 5,988,078 A | 11/1999 | Levine | 6,263,507 B1 | 7/2001 | Ahmad et al. | |
| 5,990,890 A | 11/1999 | Etheredge | 6,268,849 B1 | 7/2001 | Boyer et al. | |
| 5,990,927 A | 11/1999 | Hendricks et al. | 6,275,268 B1 | 8/2001 | Ellis et al. | |
| 5,999,912 A | 12/1999 | Wodarz et al. | 6,279,157 B1 | 8/2001 | Takasu | |
| 6,002,393 A | 12/1999 | Hite et al. | 6,285,713 B1 | 9/2001 | Nakaya et al. | |
| 6,002,394 A | 12/1999 | Schein et al. | 6,286,140 B1 | 9/2001 | Ivanyi | |
| 6,005,562 A | 12/1999 | Shiga et al. | 6,289,346 B1 | 9/2001 | Milewski et al. | |
| 6,005,565 A | 12/1999 | Legall et al. | 6,298,482 B1 | 10/2001 | Seidman et al. | |
| 6,005,597 A | 12/1999 | Barrett et al. | 6,311,877 B1 | 11/2001 | Yang et al. | |
| 6,006,257 A | 12/1999 | Slezak | 6,312,336 B1 | 11/2001 | Handelman et al. | |
| 6,008,802 A | 12/1999 | Iki et al. | 6,320,588 B1 | 11/2001 | Palmer et al. | |
| 6,011,546 A | 1/2000 | Bertram | 6,323,911 B1 | 11/2001 | Schein et al. | |
| 6,014,137 A | 1/2000 | Burns | 6,331,877 B1 | 12/2001 | Bennington et al. | |
| 6,014,502 A | 1/2000 | Moraes | 6,341,195 B1 | 1/2002 | Mankovitz et al. | |
| 6,016,141 A | 1/2000 | Knudson et al. | 6,342,926 B1 | 1/2002 | Hanafee et al. | |
| 6,018,372 A | 1/2000 | Etheredge | 6,357,042 B2 | 3/2002 | Srinivasan et al. | |
| 6,018,768 A | 1/2000 | Ullman et al. | 6,363,525 B1 | 3/2002 | Dougherty et al. | |
| 6,020,883 A | 2/2000 | Herz et al. | 6,381,582 B1 | 4/2002 | Walker et al. | |
| 6,020,929 A | 2/2000 | Marshall et al. | 6,388,714 B1 | 5/2002 | Schein et al. | |
| 6,025,837 A * | 2/2000 | Matthews et al. ........... 345/721 | 6,389,593 B1 | 5/2002 | Yamagishi | |
| 6,025,886 A | 2/2000 | Koda | 6,392,710 B1 | 5/2002 | Gonsalves et al. | |
| 6,028,599 A | 2/2000 | Yuen et al. | 6,396,546 B1 | 5/2002 | Alten et al. | |
| 6,029,045 A | 2/2000 | Picco et al. | 6,400,407 B1 | 6/2002 | Zigmond et al. | |
| 6,035,304 A | 3/2000 | Machida et al. | 6,405,371 B1 | 6/2002 | Oosterhout et al. | |
| 6,047,317 A | 4/2000 | Bisdikian et al. | 6,408,437 B1 | 6/2002 | Hendricks et al. | |
| 6,049,824 A | 4/2000 | Simonin | 6,411,308 B1 | 6/2002 | Blonstein et al. | |
| 6,052,145 A | 4/2000 | Macrae et al. | 6,412,110 B1 | 6/2002 | Schein et al. | |
| 6,061,060 A | 5/2000 | Berry et al. | 6,418,556 B1 | 7/2002 | Bennington et al. | |
| 6,061,097 A | 5/2000 | Satterfield | 6,421,067 B1 | 7/2002 | Kamen et al. | |
| 6,064,376 A | 5/2000 | Berezowski et al. | 6,446,261 B1 | 9/2002 | Rosser | |
| 6,064,980 A | 5/2000 | Jacobi et al. | 6,453,471 B1 | 9/2002 | Klosterman | |
| 6,067,303 A | 5/2000 | Aaker et al. | 6,463,585 B1 | 10/2002 | Hendricks et al. | |
| 6,072,460 A | 6/2000 | Marshall et al. | 6,469,753 B1 | 10/2002 | Klosterman et al. | |
| 6,075,551 A | 6/2000 | Berezowski et al. | 6,470,497 B1 | 10/2002 | Ellis et al. | |
| 6,075,575 A | 6/2000 | Schein et al. | 6,477,579 B1 | 11/2002 | Kunkel et al. | |
| 6,078,348 A | 6/2000 | Klosterman et al. | 6,477,705 B1 | 11/2002 | Yuen et al. | |
| 6,091,883 A | 7/2000 | Artigalas et al. | 6,486,920 B2 | 11/2002 | Arai et al. | |
| 6,098,065 A | 8/2000 | Skillen et al. | 6,498,895 B2 | 12/2002 | Young et al. | |
| 6,108,042 A | 8/2000 | Adams et al. | 6,515,680 B1 | 2/2003 | Hendricks et al. | |
| 6,111,614 A | 8/2000 | Mugura et al. | 6,539,548 B1 | 3/2003 | Hendricks et al. | |

| | | | | | |
|---|---|---|---|---|---|
| 6,546,556 B1 | 4/2003 | Kataoka et al. | CA | 2312326 | 6/1999 |
| 6,564,378 B1 | 5/2003 | Satterfield et al. | DE | 3246225 | 6/1984 |
| 6,564,379 B1 | 5/2003 | Knudson et al. | DE | 3337204 | 4/1985 |
| 6,574,424 B1 | 6/2003 | Dimitri et al. | DE | 3621263 | 1/1988 |
| 6,588,013 B1 | 7/2003 | Lumley et al. | DE | 3909334 | 9/1990 |
| 6,600,364 B1 | 7/2003 | Liang et al. | DE | 19531121 | 2/1997 |
| 6,600,503 B2 | 7/2003 | Stautner et al. | DE | 19740079 | 9/1999 |
| 6,606,128 B2 | 8/2003 | Hanafee et al. | DE | 19931046 | 1/2001 |
| 6,622,306 B1 | 9/2003 | Kamada | EP | 0 239 884 | 10/1987 |
| 6,651,251 B1 * | 11/2003 | Shoff et al. ............. 725/37 | EP | 0 396 062 | 11/1990 |
| 6,660,503 B2 | 12/2003 | Kierulff | EP | 0 401 930 | 12/1990 |
| 6,665,869 B1 | 12/2003 | Ellis et al. | EP | 0 408 892 | 1/1991 |
| 6,687,906 B1 | 2/2004 | Yuen et al. | EP | 0 420 123 | 4/1991 |
| 6,698,020 B1 | 2/2004 | Zigmond et al. | EP | 0 424 648 A2 | 5/1991 |
| 6,732,369 B1 | 5/2004 | Schein | EP | 0 424 648 A3 | 5/1991 |
| 6,738,978 B1 | 5/2004 | Hendricks et al. | EP | 0 444 496 B1 | 9/1991 |
| 6,742,183 B1 | 5/2004 | Reynolds et al. | EP | 0 447 968 A2 | 9/1991 |
| 6,751,800 B1 | 6/2004 | Fukuda et al. | EP | 0 550 911 | 12/1992 |
| 6,757,906 B1 | 6/2004 | Look et al. | EP | 0 532 322 | 3/1993 |
| 6,799,327 B1 | 9/2004 | Reynolds et al. | EP | 0 560 593 A2 | 9/1993 |
| 6,868,551 B1 | 3/2005 | Lawler et al. | EP | 0 572 090 B | 12/1993 |
| 6,938,208 B2 | 8/2005 | Reichardt | EP | 0682452 A2 | 11/1995 |
| 6,973,669 B2 | 12/2005 | Daniels | EP | 0 725 539 | 8/1996 |
| 7,003,792 B1 | 2/2006 | Yuen | EP | 0 752 767 A2 | 1/1997 |
| 7,028,326 B1 | 4/2006 | Westlake et al. | EP | 0 762 751 A3 | 3/1997 |
| 7,069,576 B1 | 6/2006 | Knudson et al. | EP | 0 772 360 A2 | 5/1997 |
| 7,266,833 B2 | 9/2007 | Ward, III et al. | EP | 0 775 417 B1 | 5/1997 |
| 2001/0001160 A1 | 5/2001 | Schoff et al. | EP | 0 784 405 A2 | 7/1997 |
| 2001/0029610 A1 | 10/2001 | Corvin et al. | EP | 0 805 594 B1 | 11/1997 |
| 2001/0042246 A1 | 11/2001 | Yuen et al. | EP | 0 822 718 A1 | 2/1998 |
| 2001/0047298 A1 | 11/2001 | Moore et al. | EP | 0 784 405 A3 | 3/1998 |
| 2001/0049820 A1 | 12/2001 | Barton | EP | 0 834 798 | 4/1998 |
| 2001/0054181 A1 | 12/2001 | Corvin | EP | 0 848 554 A2 | 6/1998 |
| 2002/0042913 A1 | 4/2002 | Ellis et al. | EP | 0 849 948 A2 | 6/1998 |
| 2002/0042918 A1 | 4/2002 | Townsend et al. | EP | 0 851 681 A1 | 7/1998 |
| 2002/0049973 A1 | 4/2002 | Alten et al. | EP | 0 854 645 A2 | 7/1998 |
| 2002/0059602 A1 | 5/2002 | Macrae et al. | EP | 0 880 856 B1 | 12/1998 |
| 2002/0073424 A1 | 6/2002 | Ward, III et al. | EP | 0 905 985 A2 | 3/1999 |
| 2002/0083439 A1 | 6/2002 | Eldering | EP | 0 924 927 A2 | 6/1999 |
| 2002/0092017 A1 | 7/2002 | Klosterman et al. | EP | 0 935 393 A2 | 8/1999 |
| 2002/0120933 A1 | 8/2002 | Knudson et al. | EP | 0 944 253 A1 | 9/1999 |
| 2002/0124249 A1 | 9/2002 | Shintani et al. | EP | 0 963 119 A1 | 12/1999 |
| 2003/0005432 A1 | 1/2003 | Ellis et al. | EP | 0 988 876 | 3/2000 |
| 2003/0110499 A1 | 6/2003 | Knudson et al. | EP | 1 095 504 B1 | 5/2001 |
| 2003/0163813 A1 | 8/2003 | Klosterman et al. | EP | 0 822 718 B1 | 6/2002 |
| 2003/0164858 A1 | 9/2003 | Klosterman et al. | FR | 2662895 | 12/1991 |
| 2003/0188310 A1 | 10/2003 | Klosterman et al. | GB | 1 554 411 | 10/1979 |
| 2003/0188311 A1 | 10/2003 | Yuen et al. | GB | 2034995 | 6/1980 |
| 2003/0196201 A1 | 10/2003 | Schein et al. | GB | 2126002 | 3/1984 |
| 2003/0208756 A1 | 11/2003 | Macrae et al. | GB | 2185670 | 7/1987 |
| 2003/0208758 A1 | 11/2003 | Schein et al. | GB | 2256546 | 12/1992 |
| 2004/0139465 A1 | 7/2004 | Matthews et al. | GB | 2309134 A | 7/1997 |
| 2004/0194131 A1 | 9/2004 | Ellis et al. | JP | 58-137334 | 8/1983 |
| 2004/0194138 A1 | 9/2004 | Boylan, III et al. | JP | 58-137344 | 8/1983 |
| 2005/0155056 A1 | 7/2005 | Knee et al. | JP | 58-196738 | 11/1983 |
| 2005/0157217 A1 | 7/2005 | Hendricks | JP | 58 201776 | 12/1983 |
| 2005/0198668 A1 | 9/2005 | Yuen et al. | JP | 59-141878 | 8/1984 |
| 2005/0204382 A1 | 9/2005 | Ellis | JP | 60-061935 | 4/1985 |
| 2005/0216936 A1 | 9/2005 | Knudson | JP | 61-074476 | 4/1986 |
| 2005/0229214 A1 | 10/2005 | Young et al. | JP | 62-060370 | 3/1987 |
| 2005/0244138 A1 | 11/2005 | O'Connor et al. | JP | 62-060384 | 3/1987 |
| 2005/0283796 A1 | 12/2005 | Flickinger | JP | 63 234679 A | 9/1988 |
| | | | JP | 01-307944 | 12/1989 |
| | FOREIGN PATENT DOCUMENTS | | JP | 02-048879 | 2/1990 |
| | | | JP | 03063990 | 3/1991 |
| AU | 731010 | 7/1998 | JP | 04-227380 | 8/1992 |
| AU | 733993 | 2/1999 | JP | 05-183826 | 7/1993 |
| CA | 1187197 | 5/1985 | JP | 05-284437 | 10/1993 |
| CA | 1188811 | 6/1985 | JP | 06-021907 | 1/1994 |
| CA | 1196082 | 10/1985 | JP | 61-050470 | 5/1994 |
| CA | 1200911 | 2/1986 | JP | 07-123326 | 5/1995 |
| CA | 2151458 | 6/1994 | JP | 07-147657 | 6/1995 |
| CA | 2164608 | 12/1994 | JP | 07-288759 | 10/1995 |

| | | |
|---|---|---|
| JP | 07-321748 | 12/1995 |
| JP | 08-32528 | 2/1996 |
| JP | 08-32538 | 2/1996 |
| JP | 08-125497 | 5/1996 |
| JP | 08-251122 | 9/1996 |
| JP | 08-275077 | 10/1996 |
| JP | 09-037172 | 2/1997 |
| JP | 09037151 | 2/1997 |
| JP | 09-102827 | 4/1997 |
| JP | 2838892 | 10/1998 |
| WO | WO 86/01962 | 3/1986 |
| WO | WO 87/03766 | 6/1987 |
| WO | WO 88/04057 | 6/1988 |
| WO | WO 88/04507 | 6/1988 |
| WO | WO 89/02682 | 3/1989 |
| WO | WO 89/03085 | 4/1989 |
| WO | WO 89/12370 | 12/1989 |
| WO | WO 90/01243 | 2/1990 |
| WO | WO 90/15507 | 12/1990 |
| WO | WO 91/00670 | 1/1991 |
| WO | WO 91/18476 | 11/1991 |
| WO | WO 92/04801 | 3/1992 |
| WO | WO 93/04473 | 3/1993 |
| WO | WO 93/05452 | 3/1993 |
| WO | WO 93/11638 | 6/1993 |
| WO | WO 93/11639 | 6/1993 |
| WO | WO 93/11640 | 6/1993 |
| WO | WO 93/23957 | 11/1993 |
| WO | WO 94/13107 | 6/1994 |
| WO | WO 94/14281 | 6/1994 |
| WO | WO 94/14282 | 6/1994 |
| WO | WO 94/14283 | 6/1994 |
| WO | WO 94/14284 | 6/1994 |
| WO | WO 94/21085 | 9/1994 |
| WO | WO 94/29811 | 12/1994 |
| WO | WO 95/01056 | 1/1995 |
| WO | WO 95/01058 | 1/1995 |
| WO | WO 95/01059 | 1/1995 |
| WO | WO 95/06389 | 3/1995 |
| WO | WO 95/07003 | 3/1995 |
| WO | WO 95/10910 | 4/1995 |
| WO | WO 95/15649 | 6/1995 |
| WO | WO 95/15657 | 6/1995 |
| WO | WO 95/15658 | 6/1995 |
| WO | WO 95/19092 A1 | 7/1995 |
| WO | WO 95/28055 | 10/1995 |
| WO | WO 95/30961 | 11/1995 |
| WO | WO 95/31069 | 11/1995 |
| WO | WO 95/32583 | 11/1995 |
| WO | WO 95 32585 | 11/1995 |
| WO | WO 96/07270 A | 3/1996 |
| WO | WO 96/08109 | 3/1996 |
| WO | WO 96/08113 | 3/1996 |
| WO | WO 96 09721 | 3/1996 |
| WO | WO 96/13932 A1 | 5/1996 |
| WO | WO 96/13935 | 5/1996 |
| WO | WO 96/17467 | 6/1996 |
| WO | WO 96/17473 | 6/1996 |
| WO | WO 96/21990 | 7/1996 |
| WO | WO 96/26605 | 8/1996 |
| WO | WO 96/31980 | 10/1996 |
| WO | WO 96/34467 | 10/1996 |
| WO | WO 96/34486 | 10/1996 |
| WO | WO 96/34491 | 10/1996 |
| WO | WO 96/38799 | 12/1996 |
| WO | WO 96/41471 | 12/1996 |
| WO | WO 96/41477 | 12/1996 |
| WO | WO 96/41478 | 12/1996 |
| WO | WO 97/04595 | 2/1997 |
| WO | WO 97/07656 | 3/1997 |
| WO | WO 97/013368 | 4/1997 |
| WO | WO 97/17774 | 5/1997 |
| WO | WO 97/18675 | 5/1997 |
| WO | WO 97/26612 | 7/1997 |
| WO | WO 97/31480 | 8/1997 |
| WO | WO 97/41673 | 11/1997 |
| WO | WO 97/42763 | 11/1997 |
| WO | WO 97/48230 | 12/1997 |
| WO | WO 97/49237 | 12/1997 |
| WO | WO 97/49241 | 12/1997 |
| WO | WO 97/49242 | 12/1997 |
| WO | WO 98/06219 | 2/1998 |
| WO | WO 98/10589 | 3/1998 |
| WO | WO 98/16062 | 4/1998 |
| WO | WO 98/17064 | 4/1998 |
| WO | WO 98/20675 | 5/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO 98/43183 | 10/1998 |
| WO | WO 98/47279 | 10/1998 |
| WO | WO 98/56172 | 12/1998 |
| WO | WO 99/04561 | 1/1999 |
| WO | WO 99/07142 | 2/1999 |
| WO | WO 99/18722 | 4/1999 |
| WO | WO 99/29109 | 6/1999 |
| WO | WO 99/30491 | 6/1999 |
| WO | WO 99/31480 | 6/1999 |
| WO | WO 99/45700 | 9/1999 |
| WO | WO 99/45702 | 9/1999 |
| WO | WO 99/52285 | 10/1999 |
| WO | WO 99/56473 | 11/1999 |
| WO | WO 99/60783 | 11/1999 |
| WO | WO 99/60789 | 11/1999 |
| WO | WO 9956466 A1 * | 11/1999 |
| WO | WO 00/04706 | 1/2000 |
| WO | WO 00/05889 | 2/2000 |
| WO | WO 00/11865 | 3/2000 |
| WO | WO 00/16548 | 3/2000 |
| WO | WO 00/27122 | 5/2000 |
| WO | WO 00/33160 | 6/2000 |
| WO | WO 00/33224 | 6/2000 |
| WO | WO 00/33560 | 6/2000 |
| WO | WO 00/49801 | 8/2000 |
| WO | WO 00/79798 | 12/2000 |
| WO | WO 01/06784 | 1/2001 |
| WO | WO 01/15438 | 3/2001 |
| WO | WO 01/35662 | 5/2001 |
| WO | WO 02/31731 | 4/2002 |

OTHER PUBLICATIONS

U.S. Appl. No. 09/034,934, filed Mar. 4, 1998, Ellis et al.
U.S. Appl. No. 09/217,100, filed Dec. 16, 1998, Reynolds et al.
U.S. Appl. No. 09/330,792, filed Jun. 11, 1999, Knudson et al.
U.S. Appl. No. 09/332,244, filed Jun. 11, 1999, Ellis et al.
U.S. Appl. No. 09/356,268, filed Jul. 16, 1999, Rudnick et al.
"272OR Satellite Receiver User's Guide," *General Instrument*, 1991, pp. 58-61.
"Addressable Converters: A New Development at CableData," *Via Cable*, vol. 1, No. 12, Dec. 1981.
Advertisement for "TV Decisions," *Cable Vision*, Aug. 4, 1986.
"Bell Atlantic Buys Cable TV Company for $22bn," *Financial Times* (London), Oct. 14, 1993 p. 65.
"Cable Television Equipment," Jerrold Communications Publication, dated 1992 and 1993, pp. 8-2.1 to 8-6 and 8-14.1 to 8-14.3.
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
"Dial M for Movie", Funkschau 11/94 Perspektiven, Video on Demand, pp. 78-79. (English language translation attached).

"Digital Video Broadcasting (DVB); DVB specification for data broadcasting," European Telecommunication Standards Institute, Draft EN 301 192 V1.2.1 (Jan., 1999).

"'Duck Tales,'(1987)[TV Series 1987-1990], " Internet Movie Database (IMDB) [Retrieved on Apr. 7, 2007].

"Electronic Programmed Guide (EPG); Protocol for a TV Guide using electronic data transmission," by European Telecommunication Standards Institute, May 1997, Valbonne, France, publication No. ETS 300 707.

"Enhanced Content Specification," "ATVEF," from the internet at http://www.atvef.com/library/spec.html, printed Aug. 22, 2001, the document bears a Copyright date of 1998, 1999, 2000.

"European Telecommunications Standards: Digital Broadcasting Systems For Television Sound and Data Services; Specification for Service Information (SI) in Digital Video Broadcasting (DVB) Systems," European Telecommunications Standards Institute, Dec., 1994.

"Getting Started" Installation Guide, "Using Starsight 1" Manual, and Remote Control "Quick Reference Guide,".

"Interactive Computer Conference Server," IBM Technical Bulletin, vol. 34, No. 7A, Dec. 1991, pp. 375-377.

"Interface Device for Conventional TVs to Improve Functionality," IBM Technical Disclosure Bulletin, vol. 36, No.7, Jul. 1993, pp.53-54.

James Sorce, David Fay, Brian Raila and Robert Virzi, "Designing a Broadband Residential Entertainment Service: A Case Study," GTE Labaratories Incorporated, undated, pp. 141-148.

"Lists>What's On Tonite! TV Listings (fwd)," Internet article (On line), Jan. 28, 1995, XP002378869 [Retrieved on Apr. 28, 2006].

"MSA Datacasting Systems," TV Communications Journal, Jan. 1973.

"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.

"Prevue Networks and OpenTV(R) Agree to Work Together on Deploying Interactive Program Guides Worldwide," from the internet at http://www.opentv.com/news/prevuefinal.htm, printed on Jun. 28, 1999.

"Probe XL Brochure, Auto Tote Systems Inc.," (Newark, Delaware) (undated) 57 pgs.

"Prodigy Launches Interactive TV Listing", Apr. 22, 1994 public Broadcasting Report.

"Rewind, reply and unwind the new high-tech TV devices," by Lawrence J. Magid, LA Times. This document was printed from the internet on Jun. 6, 1999 and bears a date of May 19, 1999.

"Technology: Turn on, tune in and print out—An experimental interactive television service is set to alter our viewing habits," Financial Times (London), Oct. 14, 1993, p. 11.

"TV Listings Functional Spec.," Time Video Information Services, Inc., undated.

"Window 98 Feature Combines TV, Terminal and the Internet," New York Times, Aug. 18, 1998.

"StarSight Interactive Television Program Guide III" Jim Leftwich, Willy Lai & Steve Schein, Functional/ Interactional Architecture Specification Document, Orbit Interaction, Palo alto, California, Published before Apr. 19, 1995.

"StarSight Interactive Television Program Guide IV" Jim Leftwich, Willy Lai & Steve Schein, Functional/ Interactional Architecture Specification Document, Orbit Interaction, Palo Alto, California, Published before Apr. 19, 1995.

"StarSight Interactive Television Program Guide" Jim Leftwich, Willy Lai & Steve Schein Published before Apr. 19, 1995.

"TV Guide Online Set for Fall", Entertainment Marketing Letter, Aug. 1994.

Advertisement for "TV Decisions," Cable Vision, Aug. 4, 1986.

Alexander, Michael "Visualizing cleared-off desktops," Computerworld, May 6, 1991, p.20.

Antonoff, M., "Stay Tuned for Smart TV," Popular Science, Nov. 1990, pp. 62-65.

Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.

Brochure, "A New Approach To Addressability," CableData, undated.

Brochure, "Westar and Videotoken Network Present The CableComputer," Revised Aug. 15, 1985 (Plantiff's 334).

Brochure, Time Inc., "Now, Through the Advances of the Computer Age, You Can Get the Information You Want, When You Want It. Instantly and Conveniently, On Your Home TV Screen,"Time Teletext, Time Video Information Services, Inc., undated (V 79167-79175).

Brochure, VTN "Videotoken Network, New Dimension Television," Dec. 1985 (Plantiff's Exhibit 313).

Brugliera, Vito., "Digital On-Screen Display—A New Technology for the Consumer Interace," Symposium Record Cable TV Sessions of the 18th International Television Symposium & Technical Exhibition—Montreux, Switzerland, Jun. 10-15, 1993, pp. 571-586.

Cable Computer User's Guide, Rev. 1, Dec. 1985 (Plantiff's Exhibit 289).

Carne, E.B., "The Wired Household," IEEE Spectrum, vol. 16 No. 10, Oct. 1979, pp. 61-66.

Chan, Patrick P., "Learning Considerations In User Interface Design: The Room Model," Publication of the Software Portability Laboratory, University of Waterloo, Ontario, Canada, Jul. 1984.

Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.

Cox, J. et al, "Extended Services in A Digital Compression System," Proceedings from Eleven Technical Sessions: 42nd Annual Convention and Exposition of the National Cable Television Association, Jun. 1993, pp. 185-191.

Damouny, N.G., "Teletext Decoders—Keeping Up With the Latest Advances," IEEE Transactions on Consumer Electronics, vol. CE-30, No. 3, Aug. 1984, pp.429-435.

DiRosa, S. "BIGSURF Netguide", Jul. 1995, vol. 3.1 (Sections 18,21, and 28—renumbered as pp. 1-27).

Edwardson, S.M., & Gee, A., "CEEFAX: A Proposed New Broadcasting Service," Journal of the SMPTE, Jan. 1974, vol. 83 No.1, pp. 14-19.

Eitz, Gerhard, "Zukünftige Informations-und Datenangebote beim digitalen Fermsehen—EPG Und 'Lesezeichen'," RTM Rundfunktechnische Mitteilungen, Jun. 1997, vol. 41, pp.67-72.

European Search Report dated Nov. 19, 2002 from European Application No. 989446111.7.

European Telecommunication Standard, "Electronic Programme Guide (EPG); Protocol for a TV Guide using electronic data transmission," pp. 1-45, sections 1-11.12.7 and annex A-P, bearing a date of May 1997.

Hartwig, Rautenberg, Bollmann, "Broadcasting and Processing of Program Guides for Digital TV," SMPTE Journal, pp. 727-732, Oct. 1997.

Hedger, J., "Telesoftware: Home Computing Via Broadcast Teletext," IEEE Transactions on Consumer Electronics, vol. CE-25, No. 3, Jul. 1979, pp. 279-287.

Hiroshi Ishii et al, "Clearface: Translucent Multiuser Interface for TeamWorkStation," ECSCW, Sep. 1991, pp. 6-10.

Hirotada Ueda et al, "Impact: An Interacive Natural-Motion-Picture Dedicated Multi-Media Authoring System," Communications of the ACM, Mar. 1991, pp. 343-350.

Hofmann, Neumann, Oberlies & Schadwinkel, "Videotext Programmeirt Videorecorder," Rundfunktechnischen Mitteilungen, (Broadcast Engineering Reports), vol. 26, No.6, pp. 254-257, Nov.-Dec. 1982.

Instruction Manual "Using StarSight 2" Published before Apr. 19, 1995.

Instruction Manual, "Using StarSight 2," StarSight Telecast, Inc., Starsight CB 1500 Customer Letter, 1994.

Instructional Manual, "Sonic The Hedgehoge," Sega of America, 1992.

James, A., "Oracle—Broadcasting the Written Word," Wireless World, Jul. 1973, vol. 79 No.1453, pp. 314-316.

Judice, C.N., "Move Over Cable, Here Comes Video Via Voice Lines," Network World, Sep. 1986, p. 26.
Karstad, K., "Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik, Berlin, DE ISSN: 1436-1574.
Listing of computer code for operating system within the Cable Computer in 1985 (Plantiff's Exhibit 298).
Listing of computer code for Video HTU Program (Plantiff's Exhibit 299).
Lowenstein, R.L. and Aller, H.E., "The Inevitable March of Videotex," Technology Review, vol. 88, Oct. 1985, p. 22.
M/A-COM, Inc., "Videocipher II Satellite Descrambler Owner's Manual," dated Prior Feb. 1986, pp. 1-17.
Mack Daily, "Addressable decoder with Downloadable Operation," Proceedings from the Eleven Technical Sessions, 42nd Annual Convention and Exposition of the NCTA, Jun. 6-9, pp. 82-89.
Mannes, G., "SmartScreens: Development of Personal Navigation Systems for TV Viewers," Video Magazine, Dec. 1993.
Mar. 19, 1985 letter from G. Knapp of CableData to R. Hansen of Weststar Communications, Inc. (Plantiff's Exhibit 325).
Markowitz, A. "Companies Jump on Interactive Bandwagon," *Discount Store News*, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell,R.G., "Tac Timer," 1986 NCTA Technical Papers, pp. 203-206.
No subject, "Tom Schauer (tschauer@moscow.com)Thu, Sep. 28, 1995 16:46:48-700," XP-002378870 [Retrieved from the Internet Apr. 28, 2006].
Pfister, Larry T., "Teletext: Its Time Has Come," Prepared For The IGC Videotext /Teletext Conference, Andover, Massachusettes, Dec. 14, 1982, pp. 1-11.
Preview Guide Brochure, Spring 1994.
Rayers, D.J., "Telesoftware by Teletext," 1984 IEEE Conference Papers, vol. 240, p. 323.
Rogers, "*Telcos vs. Cable TV*: The Global View With Markets Converging And Regulatory Barriers Falling, Service Carriers Are Ready To Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," *The Sun*, Baltimore Maryland Dec. 15, 1994, 1 pg.
Schlender, B.R., "Couch Potatoes! Now It's Smart TV," Fortune, Nov. 20, 1989, pp. 111-116.
Schmuckler, Eric, "A marriage that's made in cyberspace (television networks pursue links with online inforamtion services)," May 16, 1994 MEDIAWEEK, v. 4, No. 20, p.22(3).
Sealfon, Peggy, "High Tech TV," Photographic,Dec. 1984.
Sunada, K. et al., "Teletext Color Television Receiver Model C-29M950, C26M940," NEC Home Electronics, NEC Giho, 1987.
Sussman A. "GTE Tunes In to Home TV Shopping," *PC Week*, Jun. 28, 1988, p. C15.
Tech Notes: Product Updates from M/A-COM Cable Home Group, "Videocipher Owner's Manual Update," Issue No. 6, Feb. 1986.
Technical White Paper, "OpenTV™ Operating Environment," (® 1998 OpenTV Inc.), pp. 1-12.
Transcript of the Deposition of John Roop, Oct. 1996, pp. 186-187.
Trial testimony of Michael Axford, Prevue Interactive, Inc. and United Video Satellite Group, Inc. v. Starsight Telecast, Inc., May 9, 1998, pp. 186-187, 295-315, and 352-357.
U.S. Appl. No. 10/453,388, Copy of Office Action dated Sep. 8, 2006 (Examiner Ngoc K. Vu).
Various publications of Insight Telecast, 1992 and 1993.
Veith, R.H., "Television's Teletext," Elsivier Science Publishing Co., Inc, 1983, pp. 13-20, 41-51.
Videocipher Stipulation, May 1996.
VideoGuide, "VideoGuide User's Manual," pp. 1-27 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Wittig et al, "Intelligent Media Agents in Interactive Television Systems," Proceedings of the Interna-tional Conference on Multimedia Computing and Systems, Los Alamitos, CA, US, May 15-18, 1995, pp. 182-189, XP 000603484.
Yee Hsiang Change et al., "An Open-Systems Approach to Video on Demand," *IEEE Communications Magazine*, May 1994, pp. 68-80.
Declaration Under 37 C.F.R. §1.132 Of Richard E. Glassberg, dated Oct. 20, 2006, filed in U.S. Appl. No. 10/346,266 on Oct. 24, 2006.
U.S. Appl. No. 09/034,939, copies of various Office Actions issued by the United States Patent Office and applicants' responses.
U.S. Appl. No. 10/347,673, copies of various Office Actions issued by the United States Patent Office and applicants' responses.
U.S. Appl. No. 10/744,500, Office Action issued by the United States Patent Office and applicants' response to a notice to File Missing Parts.
U.S. Appl. No. 10/401,296, copies of various Office Actions issued by the United States Patent Office and applicants' response.
U.S. Appl. No. 10/401,164, copies of various Office Actions issued by the United States Patent Office and applicants' responses.
U.S. Appl. No. 10/401,299, copies of various Office Actions issued by the United States Patent Office and applicants' responses.
U.S. Appl. No. 10/401,164, copies of various Office Actions issued by the United States Patent Office, applicants' petitions and Decisions issued by the United States Patent Office.
U.S. Appl. No. 10/401,173, Office Action issued by the United States Patent Office.
U.S. Appl. No. 09/555,551, copies of various Office Actions issued by the United States Patent Office and applicants' responses.
"Computer Network: Current Status and Outlook on Leading Science and Technology," Bureau of Science & Technology (Japan), vol. 1, Dec. 1986.
"Facsimile Transmission," NHK Research Monthy Report, Dec. 1987 (Unknown author).
"Open TV fur interaktives Fernsehen," Trend and Technik, 9-95 RFE, p. 100. (English language translation attached).
"Technological Examination & Basic Investigation Research Report on Image Databases," Japan Mechanical Engineering Organization Int'l Society for the Advancement of Image Software, Japan, Mar. 1988.
"The New Media and Broadcast Policy: An Investigation & Research Conference Report on Broadcasting Diversifiation," Radio Regulatory Bureau, Japan Ministry of Posts & Telecommunications, Mar. 1982.
Baer, R.H. "Innovative Add-On TV Products," IEEE Transactions on Consumer Electronics , vol. CE-25, Nov. 1979, pp. 765-771.
Bensch, U., "VPV Videotext Programs Videorecorder," IEEE Paper, Jun. 1988, pp. 788-792.
Neumann, Andreas, "WDR Online Aufbau und Perspektiven Automatisierter Online-Dienste im WDR," RTM Rundfunktechnische Mitteilungen, vol. 41, pp. 56-66, Jun. 1997.
U.S. Appl. No. 10/346,255, copies of a Jun. 5, 2007 Office Action issued by the United States Patent Office and applicants' response.
U.S. Appl. No. 10/346,266, copies of various Office Actions issued by the United States Patent Office and applicants' responses including a Declaration Under 37 C.F.R. § 1.132 of Richard E. Glassberg.
U.S. Appl. No. 10/346,245, copies of a Sep. 5, 2003 Office Action issued by the United States Patent Office and applicants' response.

\* cited by examiner

| OCT 30 | WED | THU | FRI | SAT | SUN | MON | TUE |
|---|---|---|---|---|---|---|---|
| NBC | 8:00P | 8:30P | | | | | |

520: Monday Night, November 4th. Heats Up with BACKDRAFT!

| KGO | Beverly Hills 90210 |
| SHOW | Jury Duty |
| HBO | Mask of Death |
| DISN | Wolves of Willoughby Chase |
| ESPN | Baseball |
| FAM | The Waltons |
| KRON | Dateline | Highway to H |
| KPIX | Ellen | Drew Carey |

8:05P

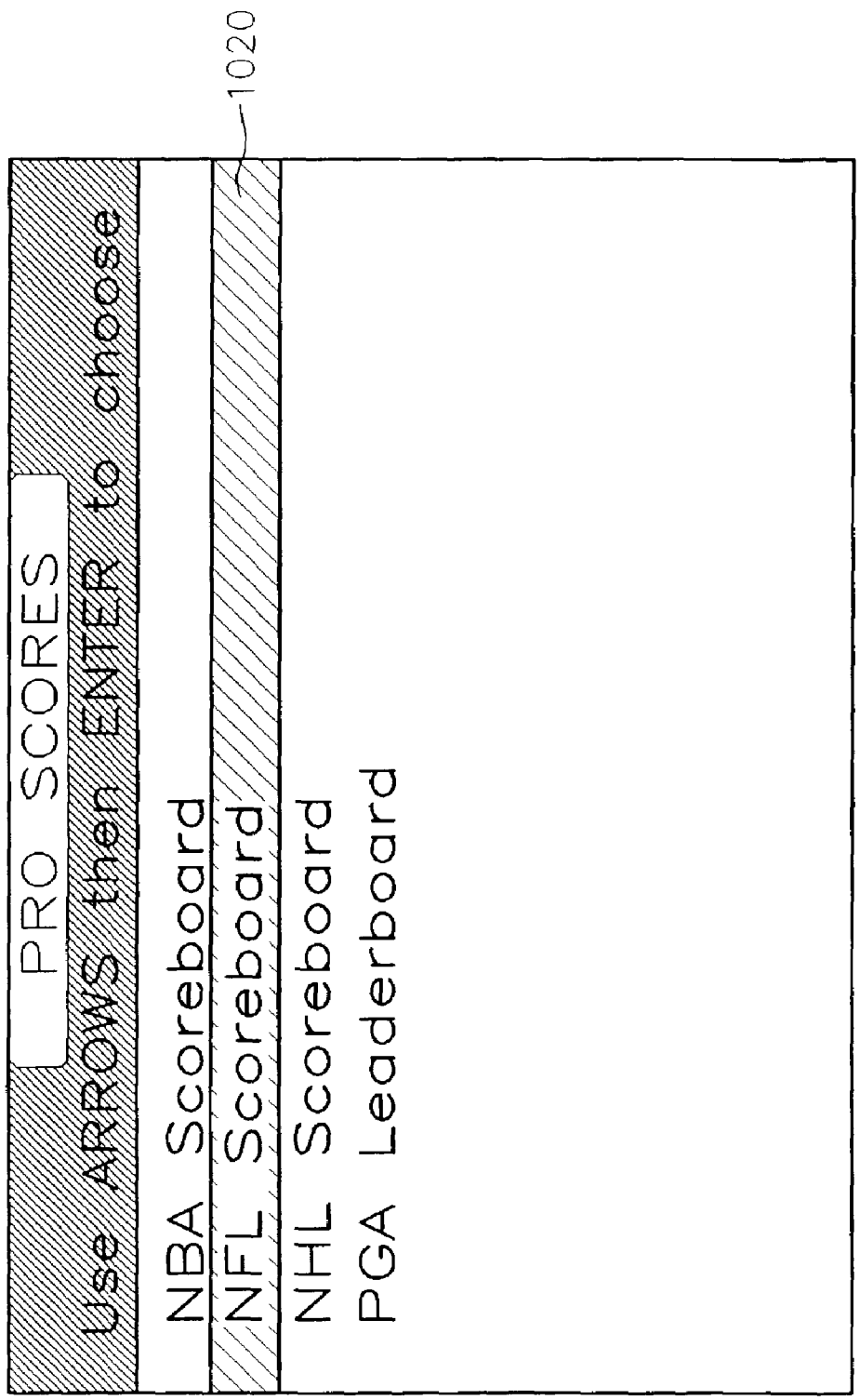

*FIG.10c*

| | PRO SCORES | | | | |
|---|---|---|---|---|---|
| ▲ | NFL SCOREBOARD | | | | |
| | SF 10 F<br>Hou 9 | Bal 37 F<br>Stl 31 | | | |
| | Pit 20 F<br>Atl 17 | Det 7 F<br>NYG 35 | | | |
| | GB 13 F<br>Tam 7 | Was 31 F<br>Ind 16 | | | |
| ▼ | Phi 20 F<br>Car 9 | Cin 28 F<br>Jac 21 | ▶ | | |

1040

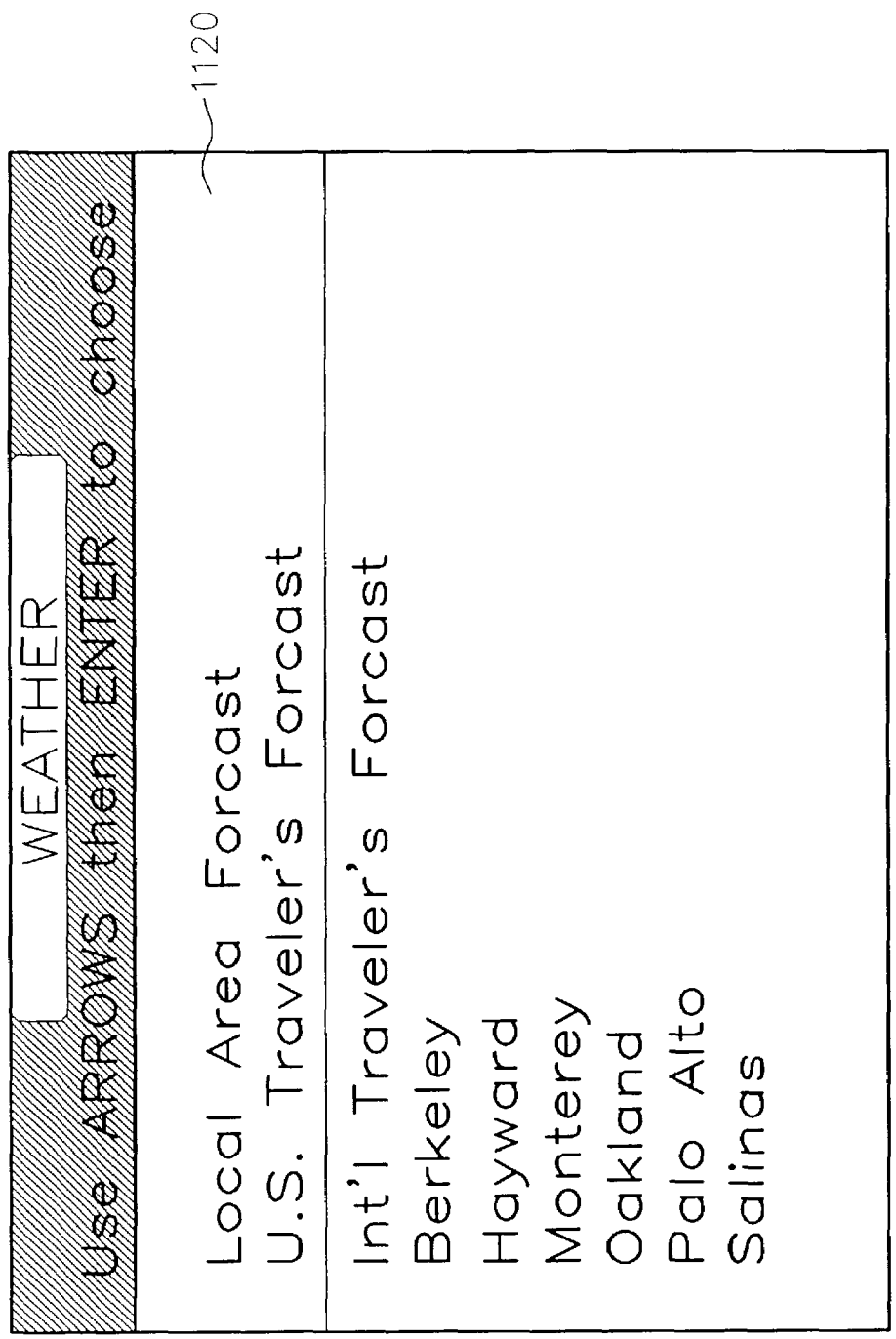

SYSTEMS AND METHODS FOR DISPLAYING INFORMATION REGIONS IN AN INTERACTIVE ELECTRONIC PROGRAM GUIDE

CROSS-REFERENCE TO RELATED APPLICATIONS

This application is a continuation of U.S. patent application "INFORMATION SYSTEM," U.S. Ser. No. 08/846,802, filed Apr. 30, 1997, now U.S. Pat. No. 6,469,753, which is a nonprovisional application of U.S. provisional patent application "ADVERTISING 'HOT ZONE' AND RELATED FEATURES," U.S. Ser. No. 60/016,871, filed May 3, 1996, having Brian Lee Klosterman as the inventor and assigned to StarSight Telecast, Inc; and U.S. provisional patent application "INFORMATION SYSTEM," U.S. Ser. No. 60/032,038, filed Nov. 26, 1996, having Brian Lee Klosterman and Steven Schein as the inventors and assigned to StarSight Telecast, Inc. The 60/016,871 and 60/032,038 applications are hereby incorporated by reference in their entirety.

BACKGROUND OF THE INVENTION

The present invention relates generally to a program schedule guide and, more particularly, to a system and process for allowing a television viewer to access on-screen television program listings and other information services in an easy and convenient way.

The number of television channels available to a user has grown dramatically within the last decade, primarily due to the availability of cable and direct broadcast satellite systems. As the number of programs of potential interest to the viewer has increased, a variety of electronic program guides have been developed to help the viewer select programs of particular interest. For example, commonly assigned U.S. Pat. Nos. 4,706,121 and 5,353,121 each describes schedule information processing systems which provide the viewer with a convenient way to select programs based on viewer supplied selection criteria.

Given the hectic lifestyle of today's society, a system which provides other information in addition to television program schedule information would be very convenient for the busy viewer. Examples of information viewers may desire are weather information, financial information, and the like. Hence, an information system such as a guide with regions reserved for such information would provide a valuable service to a user. Furthermore, these regions could be used for advertising or promotional purposes, which may or may not be interactive, thereby enabling more services to be provided without increasing the cost of the guide.

SUMMARY OF THE INVENTION

The system and method of the present invention provides a program schedule guide with information regions for displaying additional information. Alternatively, the additional information may be provided by a separate information guide, and a user may "hypertune" from the program schedule guide to the information guide, and vice versa. The information to be displayed is received by a peripheral device which can either be a stand-alone device, such as a set-top box or a web-browser box; or integrated into the user's television, VCR, computer, satellite IRD, cable box, and the like. In addition, the information may be displayed on a computer screen, a television screen, or a television monitor screen.

In a preferred embodiment of the invention, the program guide interactively displays a program schedule guide and the screen contains additional non-interactive information regions which can be used for displaying advertising or promotional messages for products or programs in a static or scrolling manner. The advertising may be for special programming events such as pay-per-view movies, current or upcoming programs, or for merchandise and services or messages to the user. The promotional information may relate to an individual network/broadcaster, or for a selected program, merchandise or services.

In another preferred embodiment of the invention, both the program guide and the information regions are interactive with the user. The interactive information regions may also display information in a static or scrolling manner, and may contain promotional information regarding a current or upcoming program or product advertising information. In addition, if the information region contains advertising information regarding a product, the user may click on the information region to see a billboard or schedule a recording of an infomercial on the product. The interactive program schedule guide and the information regions may further be combined with various other forms of information. Potential sources of additional information include news, sports, and weather. This additional information may either be available on command by the user, or continuously displayed within an area of the program guide. In another preferred embodiment, the information is displayed in a separate information guide.

In yet another preferred embodiment, the program guide is non-interactive, however the information regions containing the advertising and promotional information are interactive and may be either static or scrolling. The user may activate icons or menu items in the information regions or click on the region itself to gain access to additional displays of advertising and promotional information. In this embodiment, the user may switch between full screen display of the guide and a partial or reduced size picture-in-picture (PIP) window display of the guide via, for example, an on screen menu with cursor or pointer control. This feature allows a user to see a large scale version of the guide, or to be able to see the guide through a PIP window while also getting a "flavor" for a currently selected show through a partial observation of the show. Preferably in this mode, the audio for the show also continues to be played.

In preferred embodiments, if an information region is interactive and displays information regarding a program, the user may click on the information region and direct tune to the program if it is currently on. Alternatively, the user may schedule automatic tuning to the program when the program comes on. If the user schedules an "autotune," the system may request confirmation from the user just prior to, or at the time of the scheduled tuning of the program. Alternatively, the system may tune to the program directly. If the program is a pay-per-view program, the system may authorize payment for the program automatically. Preferably, the system will request user confirmation before tuning to or authorizing payment of the program. In addition, the user may choose to record a current program or record a future program. To do this, the user would highlight the program desired on the information region, then choose the record option, and the system would record a current program or asks if it should schedule recording of a future program.

In another preferred embodiment, the advertising or promotional information may appear only during times when the user is more likely to actually be watching the program schedule guide. The guide may further contain commercial icons that allow a user to get more information about the product or service advertised. In addition, the information displayed may change as the user moves the cursor from cell to cell in the program guide. Alternatively, the information displayed in the information regions may change after the passage of a predetermined number of seconds, regardless of user activity. Additional information regions may be displayed while the user confirms that he/she desires to autotune to an upcoming program. These information regions may contain advertising for products, programs, or services and may be displayed until the user makes his/her confirmation.

A further understanding of the nature and advantages of the present invention may be realized by reference to the remaining portions of the specification and the drawings.

BRIEF DESCRIPTION OF THE DRAWINGS

FIG. 5(a) is an illustration of an alternate embodiment of the program schedule guide screen according to the present invention with program information and an information region;

FIG. 10(b) is an illustration of a sports submenu;

FIG. 10(c) is an illustration of a sports information screen;

FIG. 11(b) is an illustration of a weather submenu;

DESCRIPTION OF THE PREFERRED EMBODIMENT

Figure 1:
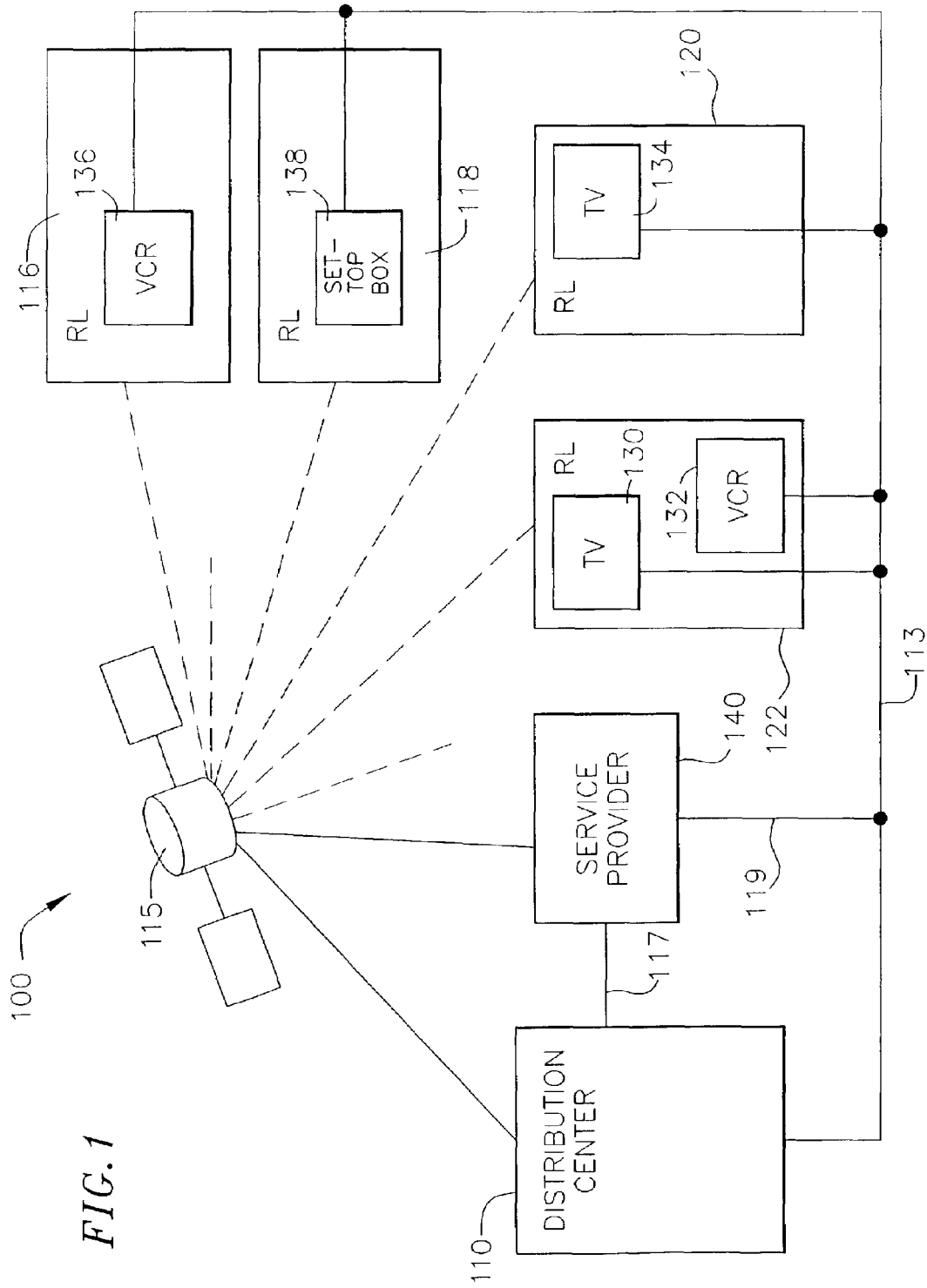
FIG. 1 illustrates a preferred embodiment of a system on which a program schedule guide according to the present invention may be displayed.

The present invention provides a schedule system which contains information regions for displaying other than television program schedule information. FIG. 1 illustrates a preferred embodiment of television/computer system 100 that displays a program schedule guide according to the present invention. As shown, system 100 includes a distribution center 110 and multiple receiving locations. Distribution center 110 compiles data for a data-stream. In a preferred embodiment, this data-stream is broadcast to receiving locations 116, 118, 120, and 122; and peripheral devices that are located within the receiving locations receive the data-stream. Several methods are available for broadcasting the data-stream from distribution center 110 to receiving locations 116, 118, 120, and 122. For example, satellite 115 may broadcast this data-stream within the vertical blanking interval (VBI) of a television channel (e.g., PBS) or a dedicated channel to receiving locations 116, 118, 120, and 122. Alternatively, the data may also be broadcast out of band, i.e., using non channel specific mechanisms. In another preferred embodiment, the data-stream is provided to receiving locations 116, 118, 120, and 122 via transmission system 113. Transmission system 113 may be, for example, optical fiber, coax cable, telephone line, over the air television broadcast, or the like.

In yet another embodiment, the peripheral devices receive the data-stream from, for example, a local service provider 140. Service provider 140 receives the data-stream from distribution center 110 via line 117, and broadcasts the data-stream to the receiving peripheral devices via satellite 115 (or another satellite), or via lines 119 and 113. The receiving peripheral devices may be televisions 130, televisions 134, VCRs 132, VCRs 136, and/or cable, satellite IRD, web-browser or set-top boxes 138. In still further embodiments, PCTVs or personal computers may be utilized, or the data-stream may be provided to a personal computer for use with the computer and/or one or more of the above devices. Hence, the system is not dependent on hardware platforms, rather it may be a software application that may be downloaded to different systems.

In a preferred embodiment, information in the data-stream includes television schedule information, advertising information, news information, weather information, financial information, internet address linking information, and the like. The information in the data-stream may further include messages from the system operator to a specific user or to subscribers of the system in general. Software applications, which may be downloaded from the distribution center or located within the peripheral devices, utilize the schedule information provided in the data-stream to generate a schedule guide. The news, weather, financial, and other information may be included in the schedule guide, or a separate information guide may be generated. Advertising information and messages from the system operator to a user are included on the schedule guide, and may be included on the information guide as well. In yet another preferred embodiment, data in the front and back end of the data-stream may be compressed to send a tickler instead of a regular full screen video display. The tickler would be a PIP window, and because the window size is small, the quality of the picture is sufficient even though it is generated from compressed data.

If the software applications are located within the peripheral devices, they may be stored on a computer-readable storage medium such as a RAM, disk, or other storage device. Where applicable, the computer-readable storage medium may also be a ROM. If the schedule guide is in a grid format, for example, the available channels may be listed on the "y" axis and various times may be listed on the "x" axis. For more information on how the schedule system displays information, see U.S. Pat. No. 4,706,121 B1, U.S. Pat. No. 5,479,266, and U.S. Pat. No. 5,479,268. These patents, like the present patent application, are assigned to StarSight Telecast, Inc., and are hereby incorporated by reference in their entirety for all purposes.

In another preferred embodiment, satellite 115 has processing capability. Hence, in addition to distribution center 110, satellite 115 may also compile data for the datastream. This embodiment is very advantageous as it ensures continued and reliable data transmission in situations where satellite 115 may not be able to receive data from distribution center 110. An example of such situations is during periods of atmospheric or terrestrial interferences, which occur when satellite 115 is in-line with distribution center 110 and the Sun. The Sun, having immense energy, emits a lot of noise thereby interfering data transmission from distribution center 110 to satellite 115. With its own data processor, satellite 115 may continue to transmit data, hence, ensuring continued and reliable data transfer to the receiving locations. This embodiment also ensures continued and reliable data transmission when distribution center 110 is out of service.

Figure 2A:
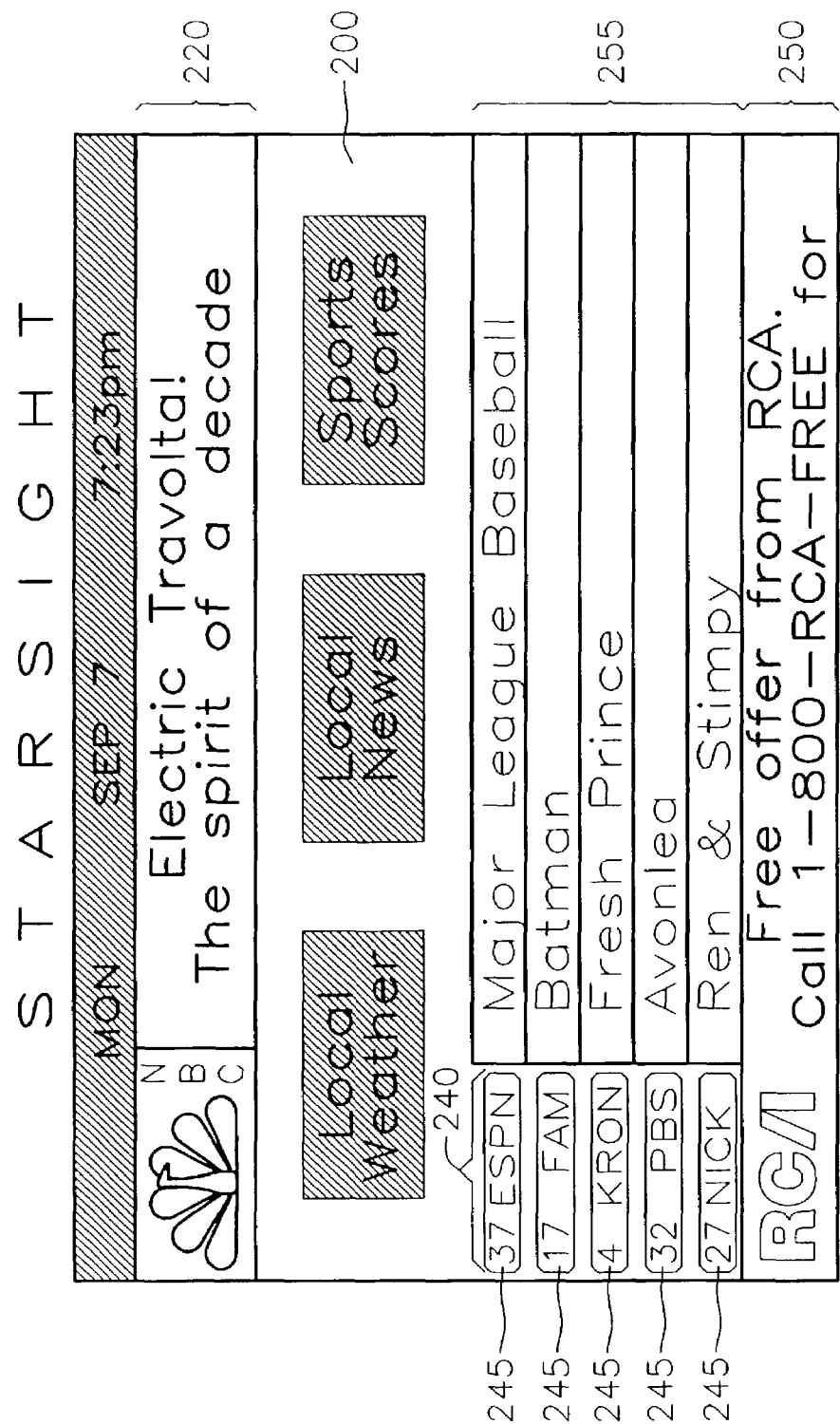
FIG. 2(a) is an illustration of a program schedule guide screen according to the present invention with program information, information icons, and information regions.

FIG. 2 is an illustration of a program schedule guide screen according to the present invention. As illustrated, program guide screen 200 has program information, information regions for offering product and program information, and information icons for offering information such as sports, news and the like. FIG. 2 shows only two information regions, 220 and 250, although guide screen 200 may have multiple information regions. As shown in FIG. 2, cell 220 shows a promotion for NBC's program featuring Travolta. Program guide screen 200 also contains an advertisement space 250. This space can be used to provide additional advertising opportunities, an example is advertisements for a system operator. Preferably the space is used for short advertisements that change periodically, for example, on three minute intervals. An example of a suitable advertisement is "Enjoy Coke!". Here cell 250 shows an advertisement from RCA. In another embodiment the information displayed in the information regions may change as the user moves from cell to cell in the program guide. Alternatively, the information may change automatically after the passage of a predetermined number of seconds, regardless of user activity. In addition or as an alternative, there may be commercial icons to allow the user to get more information about the product or service advertised.

Information regions 220 and 250 may be color coded or otherwise visually distinguished. They may also be placed at strategic positions within the guide to better catch the user's attention. As described, when an information region contains program information, such as cell 220, the user may move the cursor to the region (or the cursor may point to the region by default) and tune to the program if it is currently on. If the program is not currently on, the user may schedule an autotune to the program when the program airs. The user may further record a current program or schedule a recording of a future program. When an information region contains product information, such as cell 250, the user may click on the information region to tune to an infomercial on the product. Alternatively, the user may schedule an autotune to the infomercial at a later time period, or schedule a recording of the infomercial on the product. In a two way system, which has a back-channel for transmitting information or requests from the user, the user may also order a product by clicking on an information region and providing the necessary customer information for transmission to a supplier of the product, or to the system operator (service provider).

Portion 240 of guide screen 200 contains cells 245. Each cell 245 indicates the channel number corresponding to the program guide cell 255 lying immediately adjacent to it in the program guide. Instead of, or in combination with the channel number, cells 245 may contain the program service name. For example, a cell 245 may contain the channel number 32, the service name PBS, or both.

The system operator may charge television program providers an additional fee, per time slot, for promoting and featuring programs in the information regions. In this manner, the system operator may provide the guide to a user at a reduced price while providing more information. A number of different display arrangements can be used to draw the user's attention to such "special" programs. For example, the program may be listed First in the program guide, shown in a different typeface, presented in a different color, given additional space for a program description, or have some other form of graphic enhancement, including animation.

Figure 2B:
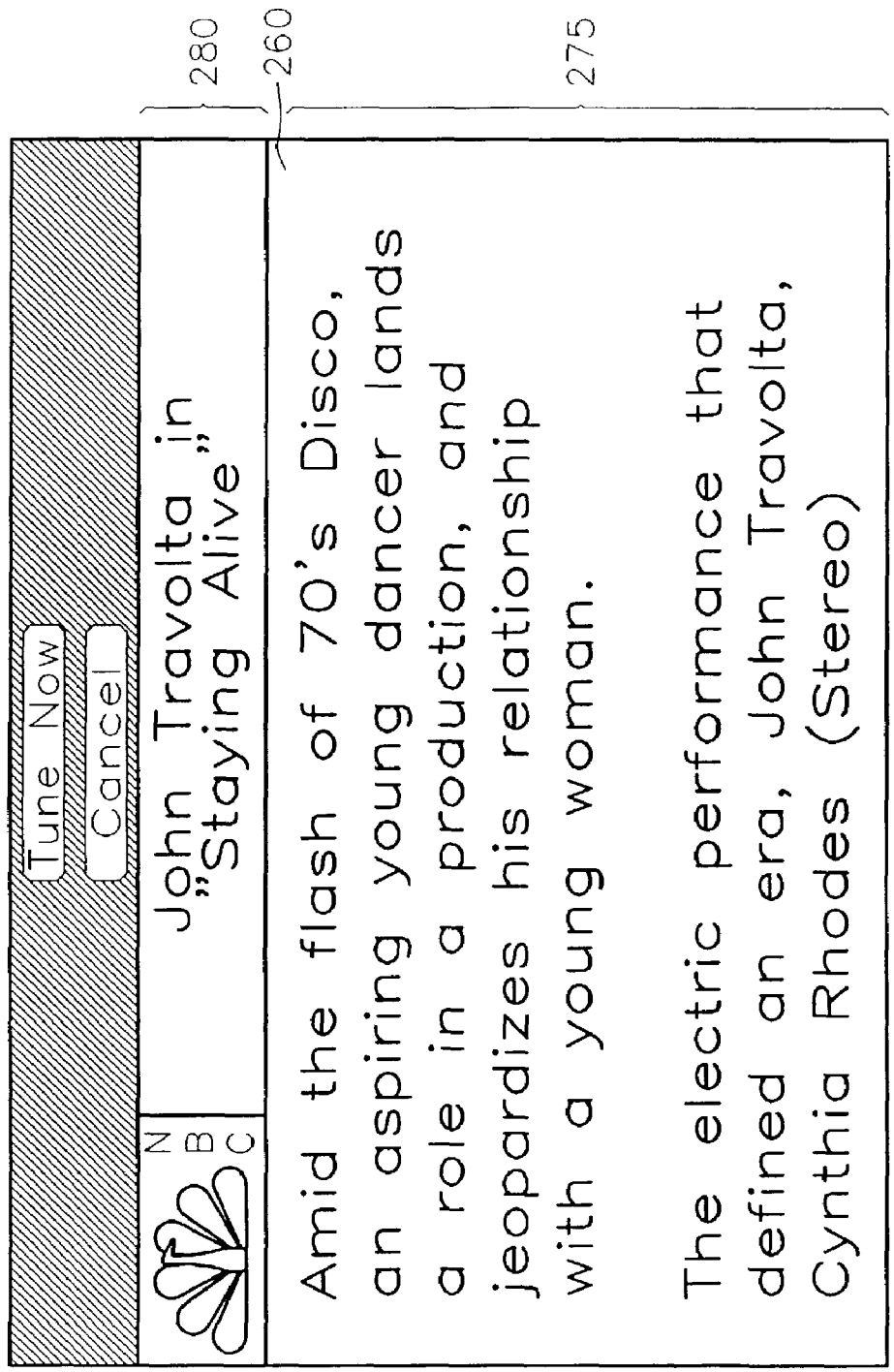
FIG. 2(b) is an illustration of a promotional message screen shown to the user when the user selects the information region of FIG. 2(a)

FIG. 2(b) is an illustration of a promotional message screen 260. Screen 260 is shown to the user when information region 220 is interactive, and the user clicks on information region 220. Promotional screen 260 may also contain an icon to allow immediate tuning to the program described by the promotional message. In addition, promotional screen 260 may contain another icon that returns the user to guide 200. Since the system operator may charge a fee for displaying such promotional information, some or all of a message portion 275 may also be used as an additional revenue source, In FIG. 2(b), portion 275 contains the promotion: "Amid the flash of 70's Disco, an aspiring young dancer . . . " This promotional material, which in this example would typically be provided by NBC, provides the user with several benefits. First, it allows a program to be promoted which is not currently represented in the program schedule guide. Second, portion 275 may be used to provide further information about a specific program, such as the starring actors or a brief description of the program content, thus possibly gaining a larger viewing audience or market share. Third, by promoting a program through prominent featuring of the program in the program guide, the broadcaster may be able to prevent potential viewers from becoming engrossed in a program which is to continue after the start time of the promoted program.

Portion 280 of screen 260 is used to indicate the sponsor of the promotional message shown in portion 275. The sponsor indication can be by broadcaster call letters, channel number, broadcaster name, or broadcaster insignia (e.g., the NBC peacock). It is also possible to eliminate portion 280, thereby enlarging portion 275. Additional information may therefore be displayed in portion 275. Since portion 280 of screen 260 displays information regarding a program, the user may click on the information region and direct tune to the program if it is currently on. Alternatively, the user may schedule automatic tuning to the program when the program comes on. If the user schedules an autotune, the system may request confirmation from the user before tuning to the program, or the system may tune to the program directly. Preferably, the system will request user confirmation before tuning to the program. If user confirmation is requested, additional information regions may be displayed until the user makes his confirmation. These information regions may include advertising for products or services.

If the promoted program is a pay-per-view program, the system may authorize payment for the program automatically. Preferably, the system will request user confirmation before authorizing payment of the program. The user may further choose to record the promoted program, whether it is a current program, a future program, or a pay-per-view program. If the user requests recording of a pay-per-view program, the system may ask for confirmation before authorizing payment for the program. If the user requests recording of a future program, the system may also request user confirmation. Additional information regions may also be displayed while the user confirms his/her recording request.

If an information region displays advertising or promotional material, the user may activate an icon, click on the region, or select a menu item to view additional information about the product or service advertised. From these additional information displays, the user may learn more about the product or service, order the product or service, or find out where the product or service may be obtained. The additional displays would of course allow the user to return to the previous displays after the user has seen the desired information displays.

The invention may also allow the user to switch between full screen display and a PIP window display of the guide via, for example, an on screen menu with cursor control. This feature would allow a user to see a large scale version of the guide, or to be able to see the guide while also getting a "flavor" for a currently selected show through only partial observation of the show. Preferably in this mode, the audio for the show also continues to be played.

Figure 3A:
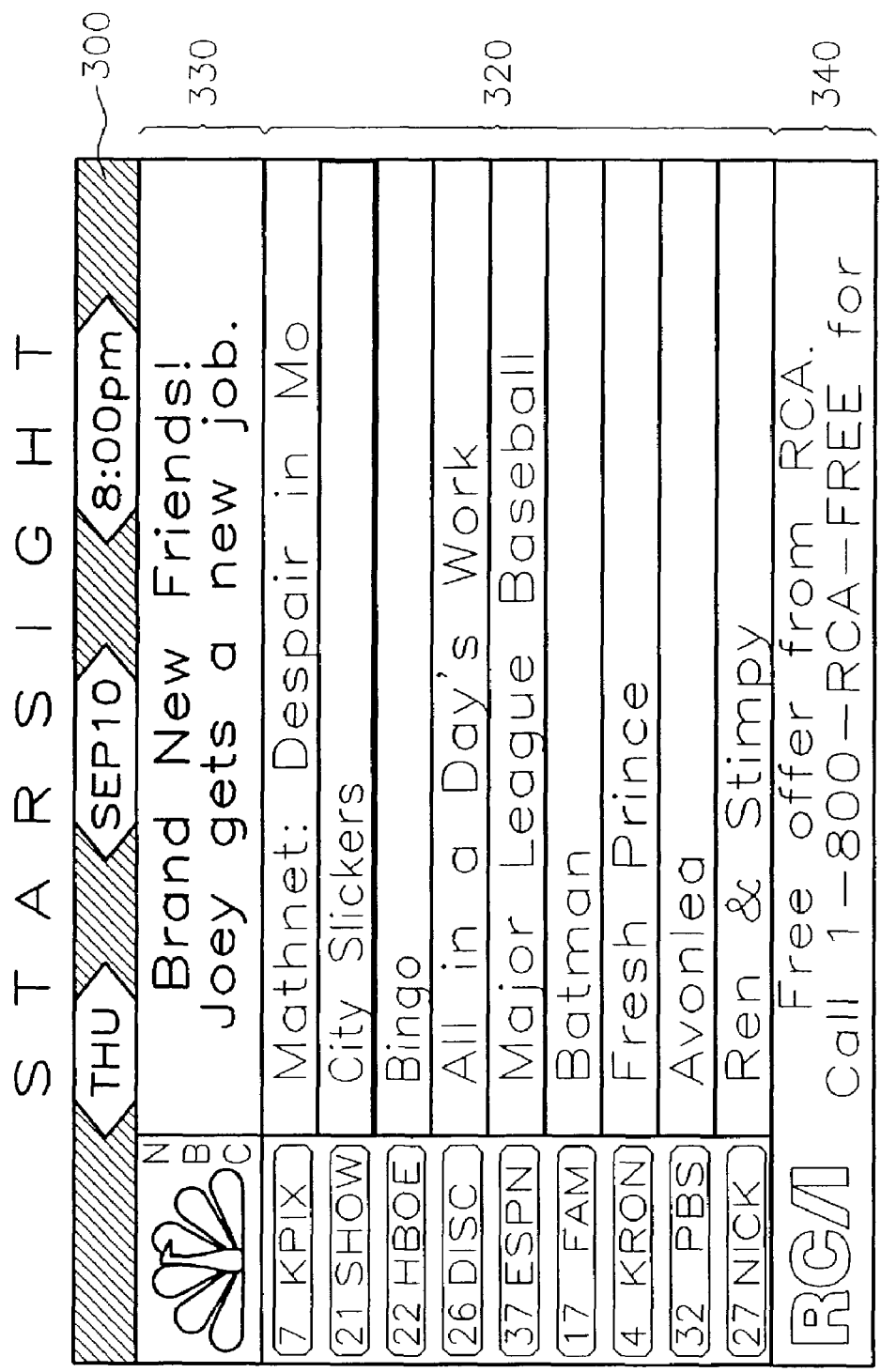
FIG. 3(a) is an illustration of a program schedule guide screen according to the present invention with program information, and information regions.
Figure 3B:
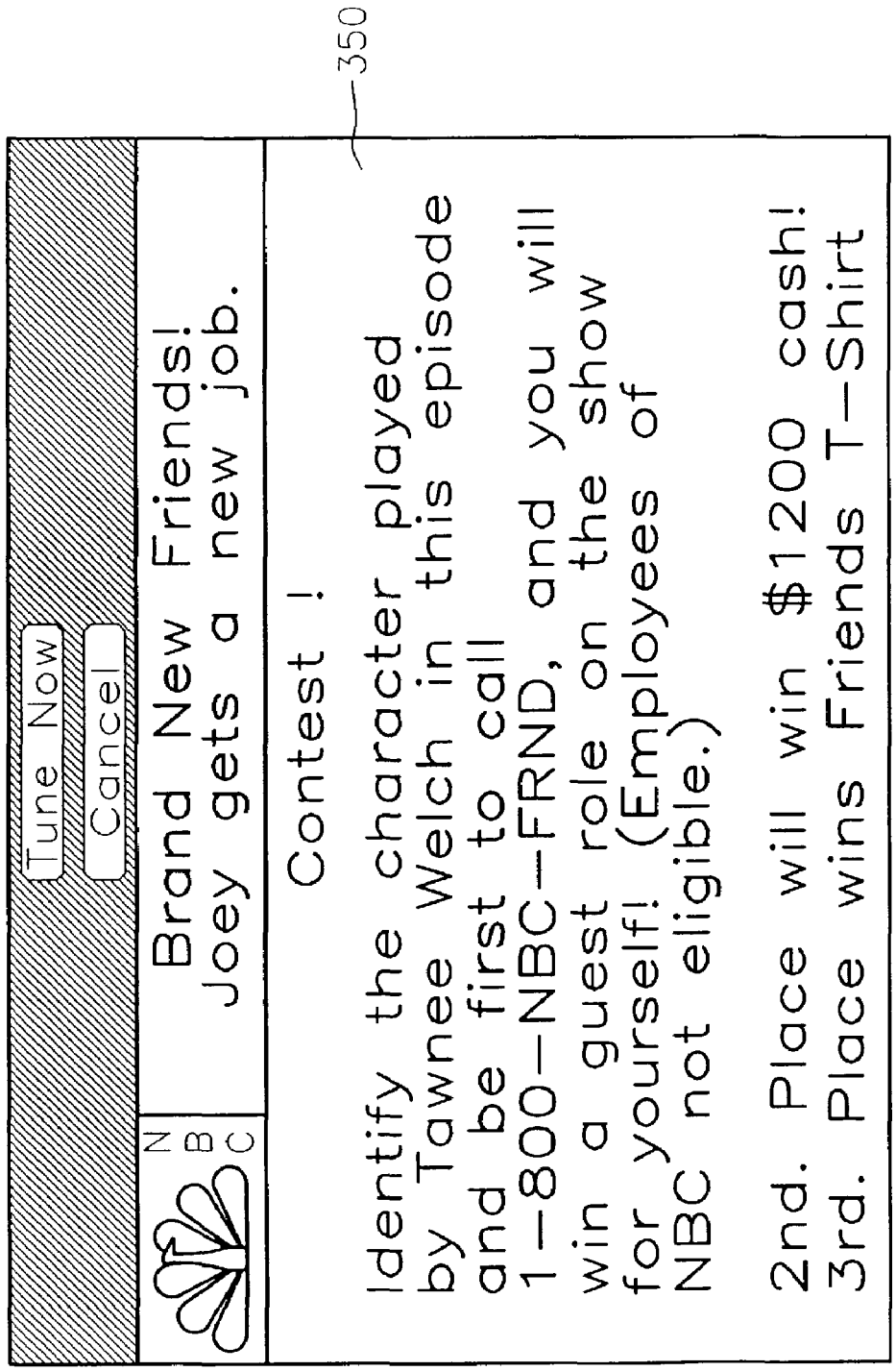
FIG. 3(b) is an illustration of a promotional message screen shown to the user when the user selects the information region of FIG. 3(a)

FIG. 3(*a*) is an illustration of a program schedule guide screen 300 with program information 320 and interactive information regions 330 and 340. As can be seen, guide screen 300 does not contain information icons. Hence, more schedule information may be shown on the screen, thereby allowing the user to access more schedule information per screen. Information region 320, like information region 220, promotes a program. In addition, it provides a brief description of the program content, thereby allowing information other than program description to be shown on promotional message screen 350 (FIG. 3(*b*)). As shown by FIG. 3(*b*), message screen 350 contains contest information, however other information related to the program may also be shown on screen 350.

Figure 4A:
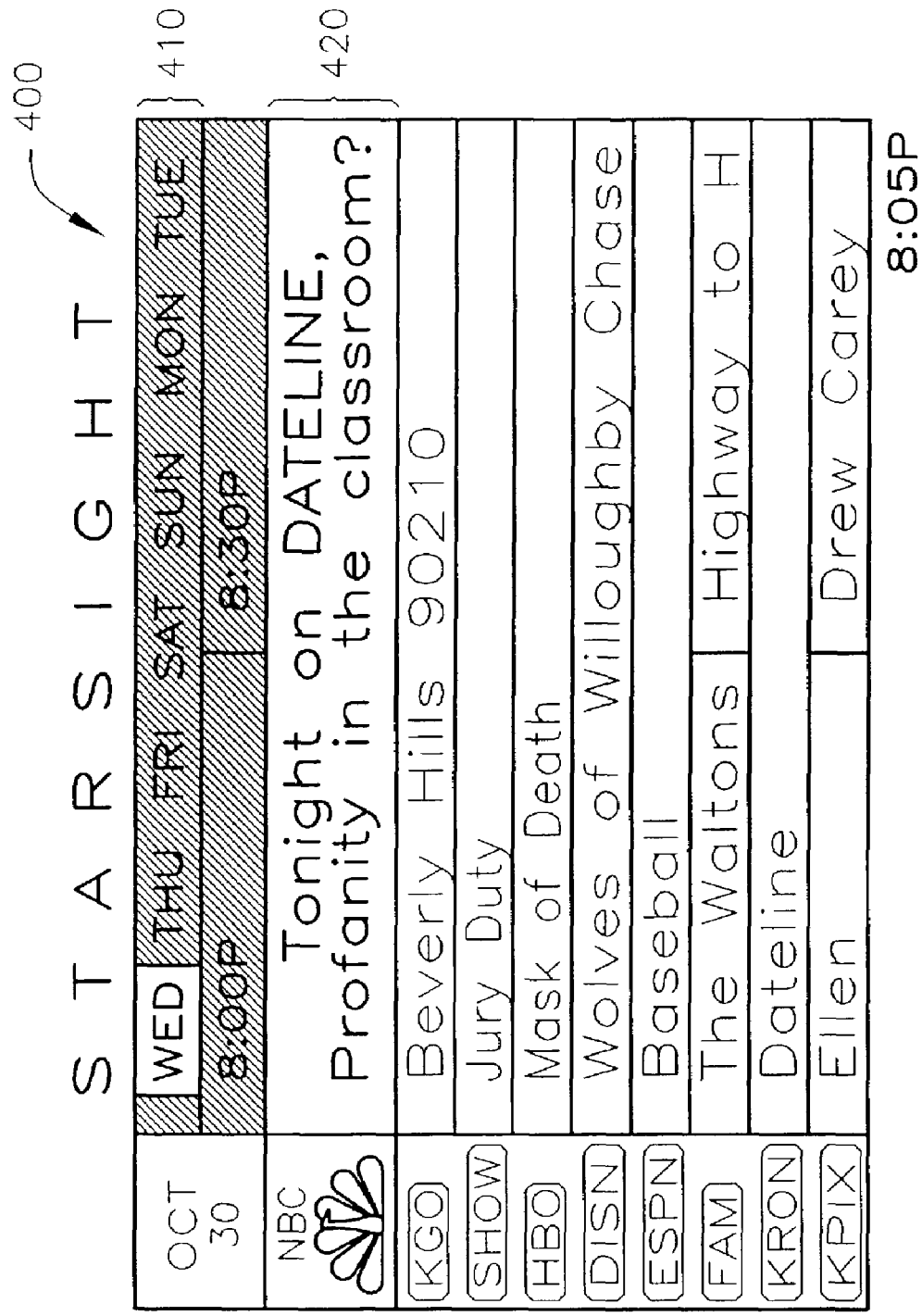
FIG. 4(a) is an illustration of an alternate embodiment of the program schedule guide screen according to the present invention with program information and an information region.
Figure 4B:
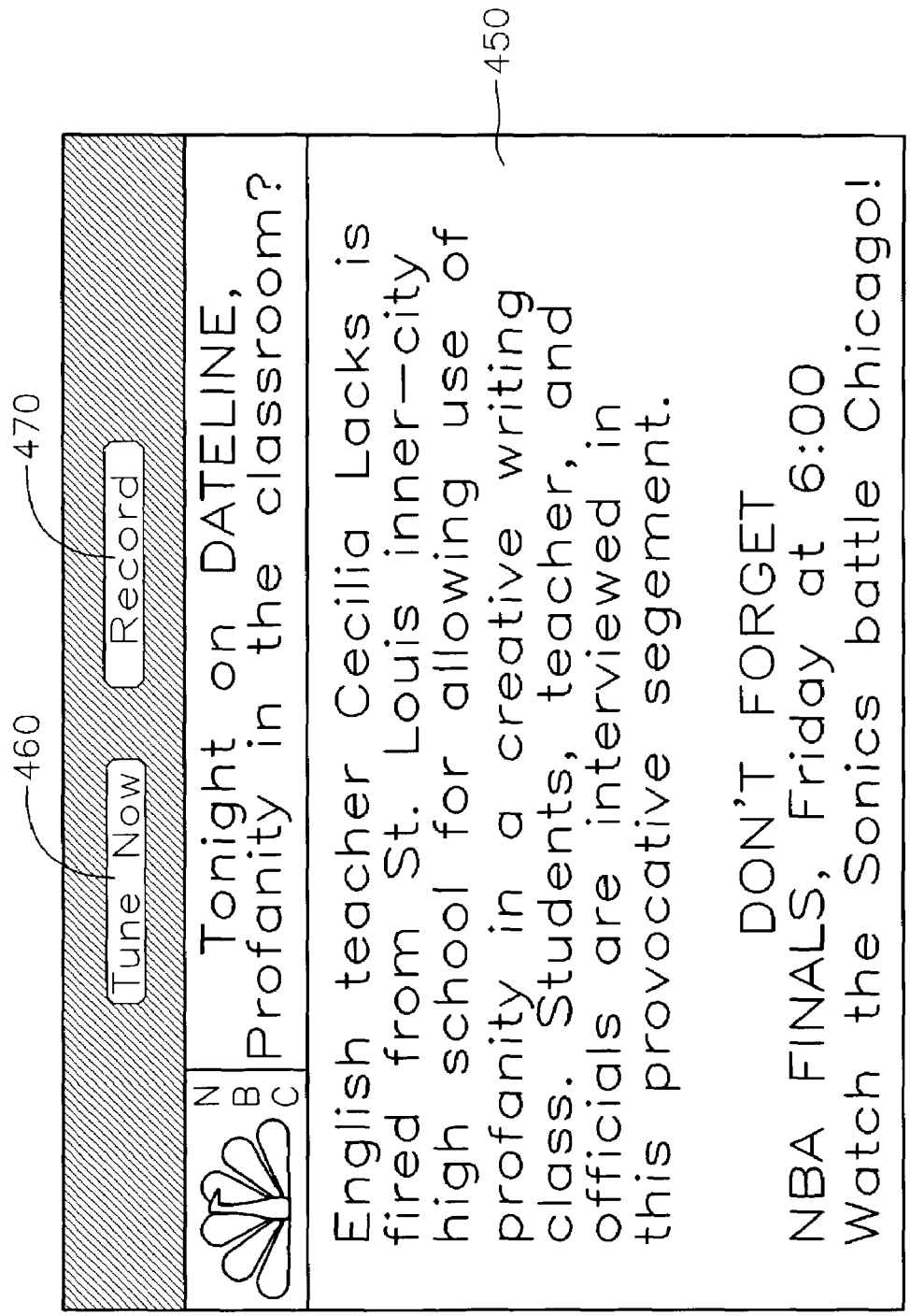
FIG. 4(b) is an illustration of a promotional message screen shown to the user when the user selects the information region of FIG. 4(a)

FIG. 4(*a*) is an illustration of a program schedule guide screen 400. As shown, the user may move a cursor across region 410 to move between the different days of the week. In FIG. 4(*a*), the user has selected Wednesday. Hence, the schedule information displayed is for Wednesday, and the time shown is the current time. The system knows what time the user is watching television, and automatically adjusts the cursor to be located on default on a cell that corresponds to the current time.

As shown, guide screen 400 has one information region 420, which is promoting a program that may be on shortly or is currently on. Information region 420 is interactive. Hence, if the user clicks on region 420, the user may see message screen 450 (FIG. 4(*b*)), which displays a description of the program content. In addition, message screen 450 may also display promotional materials about an upcoming program. This way, the system operator may indirectly promote multiple programs on region 420. If the program is currently on, the user may click on icon 460 to tune to the program. If the program will come on shortly, the user will be tuned to the channel that corresponds to the program. Alternatively, the user may click on icon 470 to start recording the program if the program is on. On occasions where the program will come on shortly, the system will start recording the program when the program comes on.

Figure 5B:
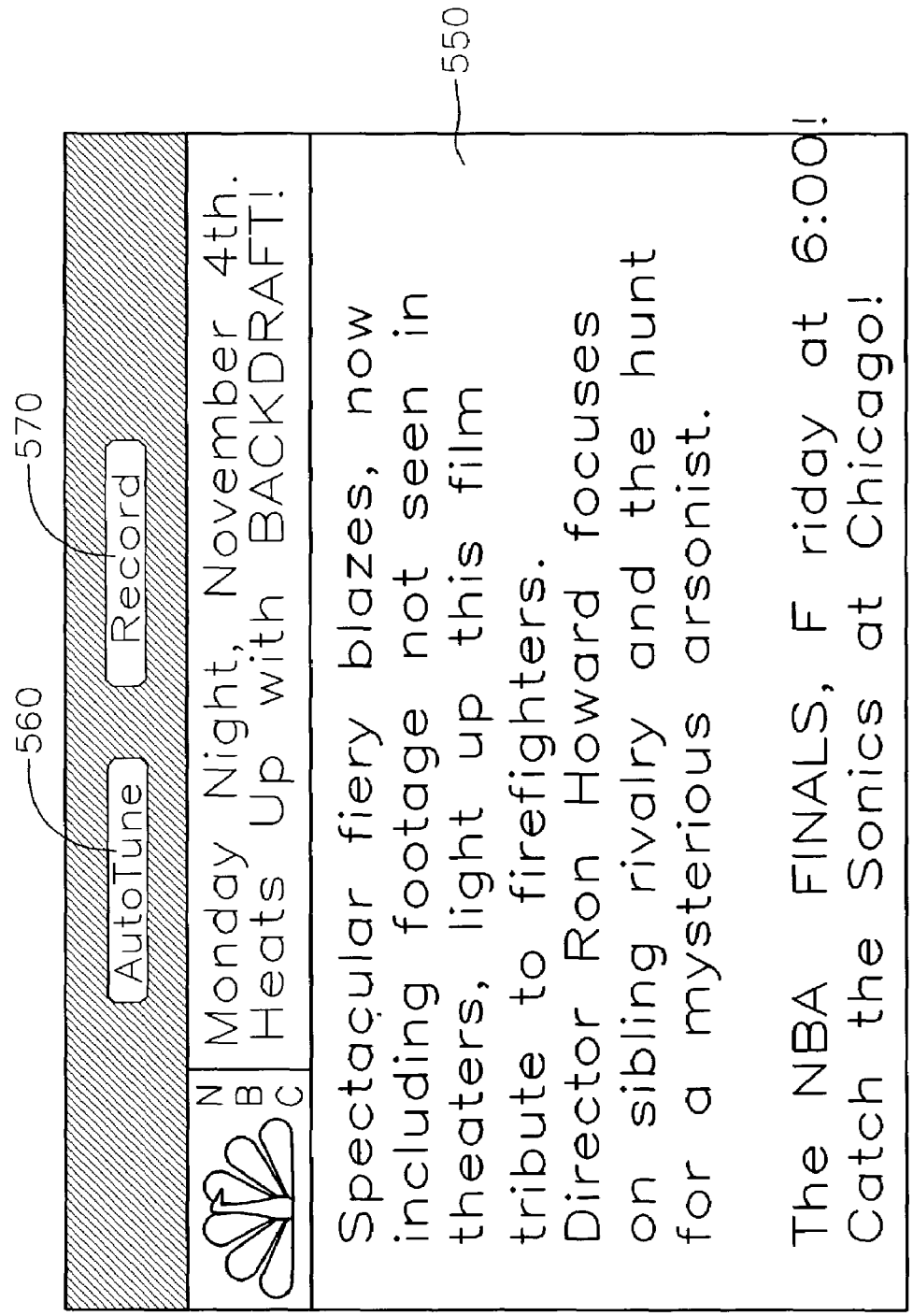
FIG. 5(b) is an illustration of a promotional message screen shown to the user when the user selects the information region of FIG. 5(a)

FIG. 5(*a*) is an illustration of a program schedule guide screen 500. As shown, guide screen 500 has one information region 520, which is interactive. Information region 520 is promoting a program that will air in the future. In this case, if the user clicks on region 520, the user may see message screen 550 (FIG. 5(*b*)), which also displays a description of the program content. In another embodiment, message screen 550 may also contain an icon, which the user may click on to view a short video preview. This preview may be shown in a PIP window, and the preview video data may be transmitted in a compressed format. As mentioned, the size of the window allows a decent video display to be generated from compressed data. Message screen 550 also displays promotional materials about an upcoming program. however, because the program will not air until a later date, message screen 550 has icon 560, which when clicked on by the user, will allow the user to schedule an autotune to the program when the program comes on. Once the user has scheduled an autotune, the system will automatically tune to the program when the program airs. Preferably, user confirmation is requested before the system tunes to the program. Alternatively, the user may click on icon 570 to schedule a recording of the program. The system will automatically start recording the program when the program comes on.

In another embodiment, the system may automatically tune a user to a promoted program when the program comes on. This may happen whether or not the user has scheduled an autotune to the program. Preferably, the system will ask the user whether the user wishes to tune to the program before automatically tuning to the program.

The interactive and non-interactive information screens may both be used for displaying scrolling messages or static messages. As discussed, these information screens may be used to promote programs as well as products. In addition, the information screens may also be used to send messages to specific users, for example, alerting a user that his/her bill is overdue. This is because each guide system has a unique Unit address. Hence, the system operator is able to send messages to specific users by sending the messages to the respective unit addresses. Of course, the information screens may be used to send system wide messages to all users. For example, the information screens may be used to send alerts to all users, for example, of an impending disaster. The information screens may further be used to send messages to a specific group of users. For example, the system could send a message to all Magnavox television owners by checking for Magnavox television codes as this information is entered into the system when the user first sets up the system. To ensure that messages to the users are read by the users, such messages will have a bit attached to them that keeps them in the information screen until the user indicates that he/she has seen the message. The user may indicate that he/she has seen the message by pushing a button on a user input device or by clicking on an icon on the guide to clear the message. This way, even though the message may be placed by the system operator in the morning, the user may still see the message when the user watches television at Prime Time. After the message is cleared, the system will place advertisements or promotions appropriate for the time when the message is cleared in the information screen.

Figure 6A:
FIG. 6(a) is an illustration of an alternate embodiment of the program schedule guide screen according to the present invention with program information and an information region.
Figure 6B:
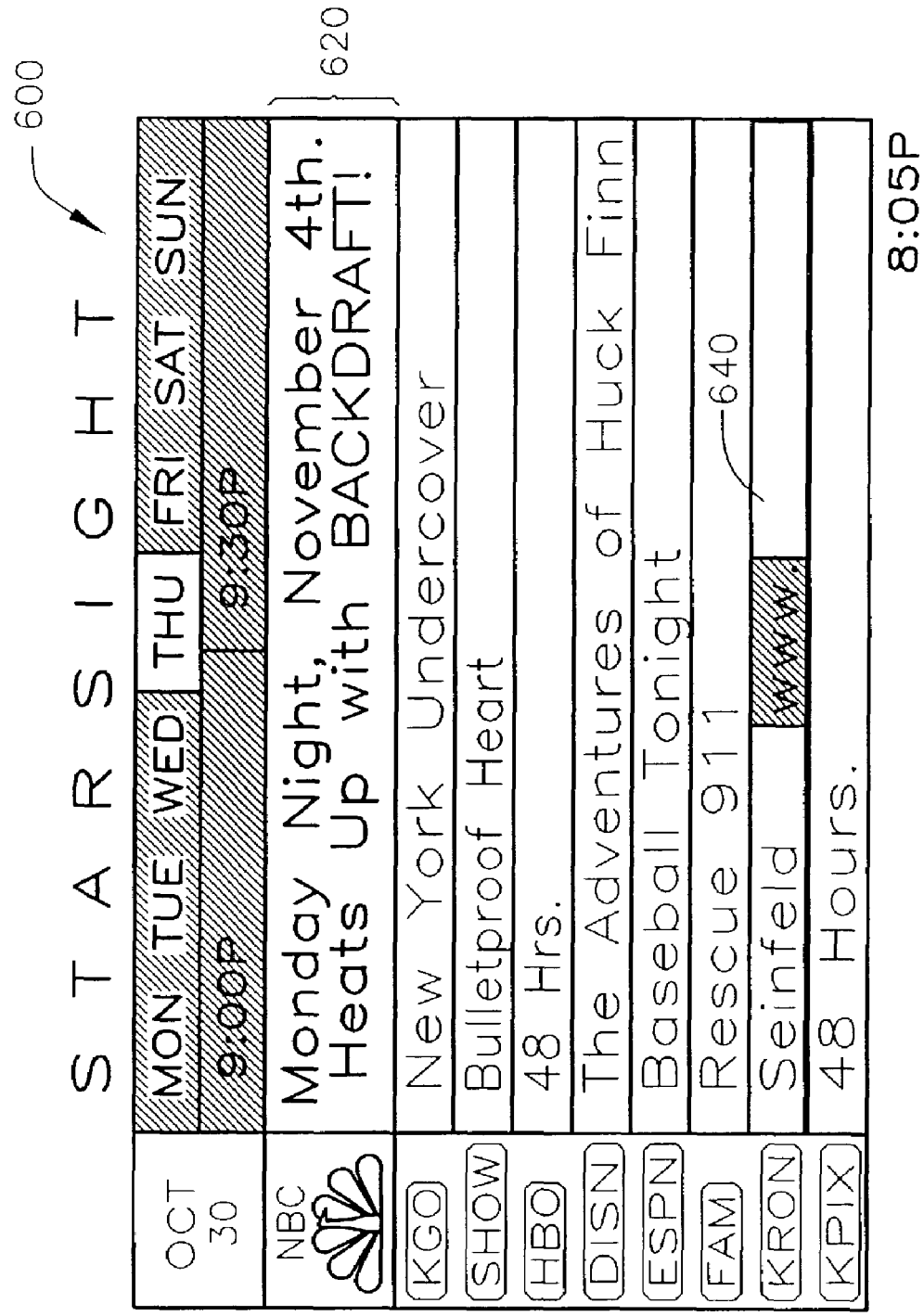
FIG. 6(b) is an illustration of an alternate embodiment of the program schedule guide screen which includes virtual channels.

FIG. 6(a) is an illustration of a program schedule guide screen 600. As shown, guide screen 600 has an interactive information region 620, which promotes a website connected with a program. In an alternate embodiment (FIG. 6(b)), guide screen 600 may include a virtual channel 640. A virtual channel is a channel that does not tune to television programs; instead, the channel may launch an application, connect to an internet site, connect to a information guide, and the like. In the example as shown in FIG. 6(b), virtual channel 640 contains an internet address—also called a Uniform Resource Locator (URL); hence it connects to an internet site. As shown in FIG. 6(b), region 620 may be used to display promotional materials in this alternate embodiment. If a user selects visual channel 640 of FIG. 6(b), or information region 620 of FIG. 6(a), the user may see submenu screen 650 of FIG. 6(c).

Figure 6C:
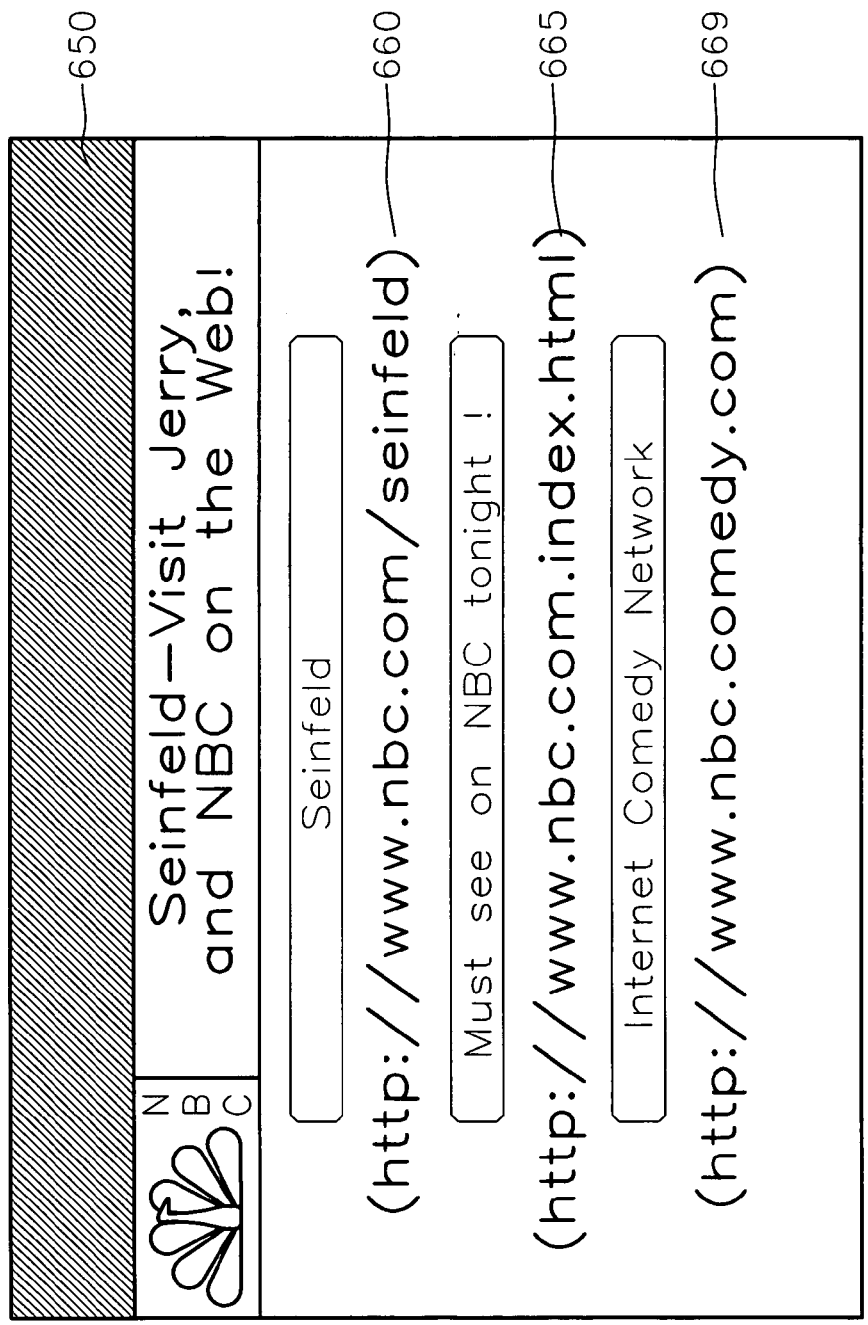
FIG. 6(c) is an illustration of a submenu screen shown to the user when the user selects the information region of FIG. 6(a) or the virtual channel of FIG. 6(b)
Figure 6D:
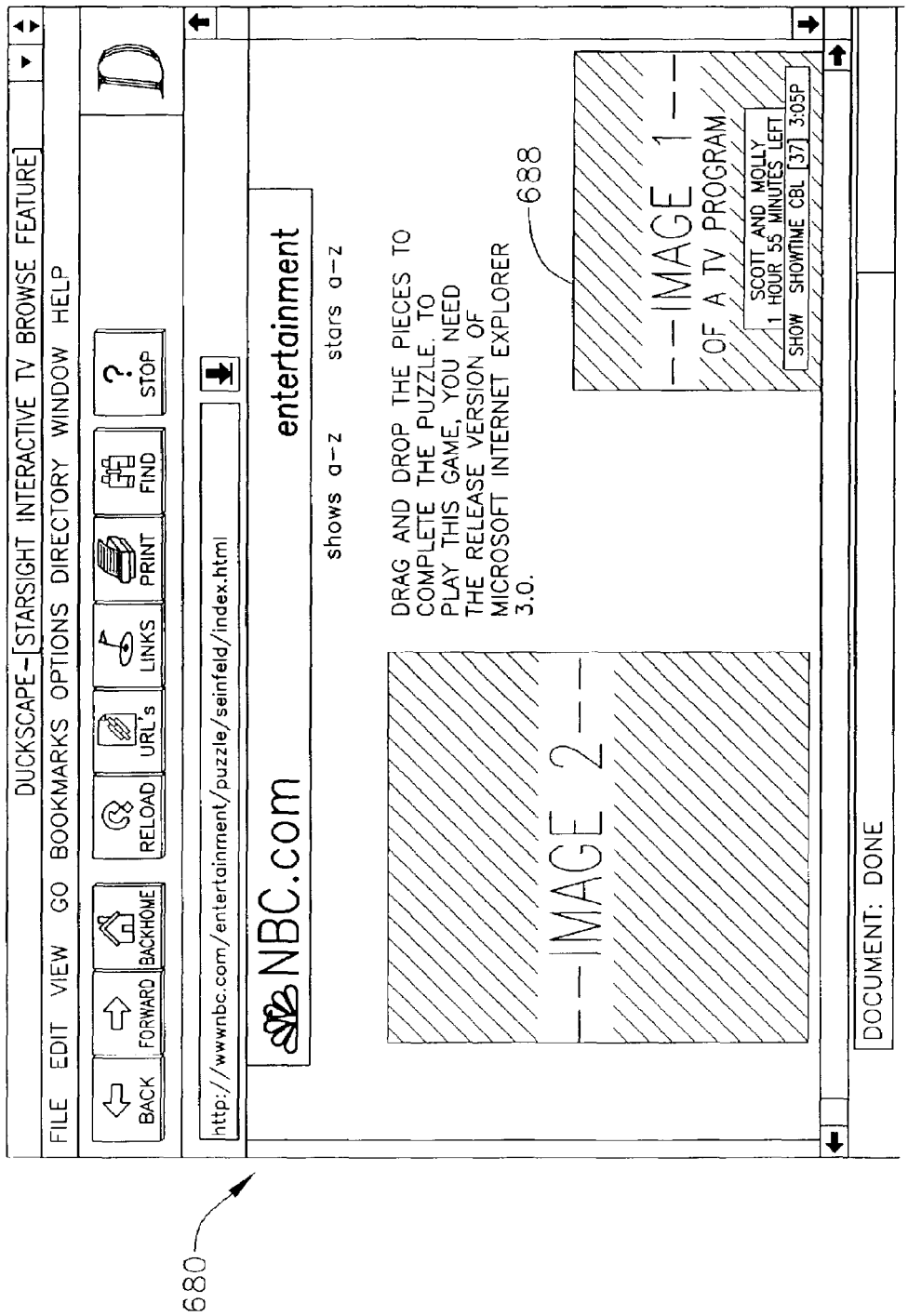
FIG. 6(d) is an illustration of a data page shown to the user when the user selects one of the options shown in the submenu screen of FIG. 6(c)

As shown in FIG. 6(c), the user may choose to connect to the Seinfeld web page, the NBC web page that promotes the Seinfeld show, or the Comedy Network web page by clicking on one of the three website icons 660, 665, and 669, respectively. The system will launch a web-browser when the user selects an information region that promotes a website, or tunes to a virtual channel containing a URL. After the user has made his/her selection, the system will insert the URL corresponding to the selected website into the web-browser, which will begin to access the web and search for the website selected by the user to connect the user to the website data page. Hence, if the user selects one of the website icons, the system will connect the user to the website that corresponds to the icon. FIG. 6(d) is an illustration of a web page 680 shown to the user when the user chooses to connect to the NBC web page. As shown, after the user is connected to the page, the user may participate in promotions on the page just as if the user had connected to the page directly through a web-browser.

FIG. 6(d) further shows window 688, which shows the television program that the user was viewing before the user selected virtual channel 640 from program guide screen 600 of FIG. 6(b), or clicked on information region 620 of FIG. 6(a). The user may resume watching the television program by clicking on window 688. This is referred as "hypertuning," and the system will return the user to the program the user was viewing. While the user is viewing the program, the system preferably displays a network icon that the user may click on to hypertune to the web page. Alternatively, the system may display the page in a picture-in-picture window such as window 688 while the viewer is viewing a program. The user may click on the picture-in-picture web page to hypertune to the page.

In another preferred embodiment, after the user has selected either icon 660, 665, or 669 of FIG. 6(c), the user may tune to the program the viewer was watching before accessing the guide. The system will display a "searching" symbol while launching a web-browser and searching for the website that the user has requested. After the system has connected to the website, the system will notify the user that the search is complete, and asks whether the user wishes to hypertune to the web page. In yet another preferred embodiment, the user may click on any program titles shown in the program guide cells, and the system will display a list of one or more websites that are related to the program. The user may select to tune to the program or connect to one of the websites. In addition, the user may click on an icon or press a remote control button to toggle between watching television and browsing the web.

Figure 7:
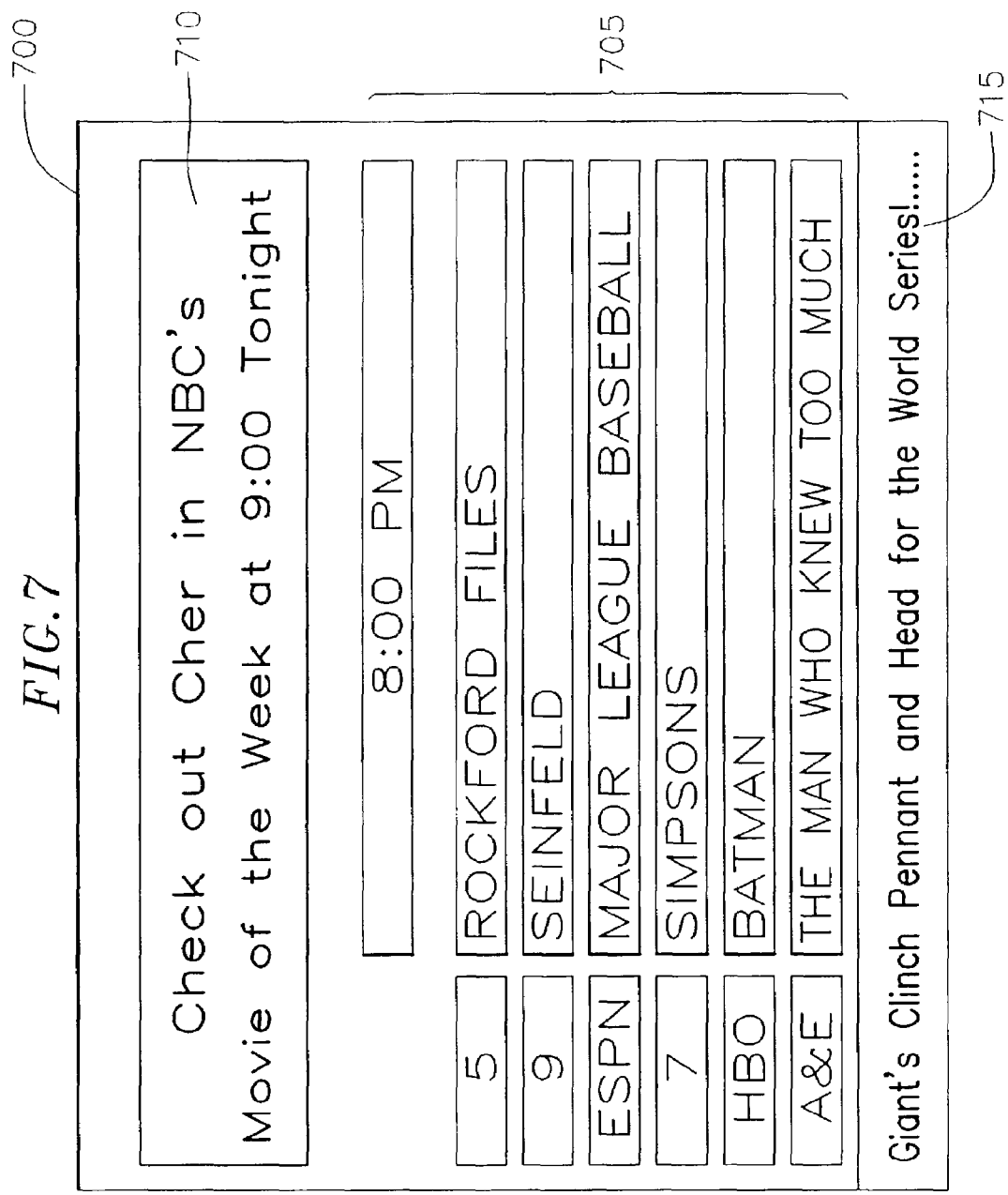
FIG. 7 is an illustration of an alternate embodiment of the program schedule guide which includes information regions.

FIG. 7 is an illustration of a program schedule guide screen 700 with noninteractive program portion 705 and interactive information regions 710 and 715. Portion 705, as shown, is a time slice of schedule information for current programs. Since the user may not interact with portion 705 of guide screen 700, portion 705 may be updated automatically over time to show current and future programs. The amount of future programs shown may be predetermined. Hence, the user may see what is currently on, and what programs will come on up to a predetermined amount of time. However, the user may not obtain more information regarding the programs, tune to the programs from portion 705, or record the programs from portion 705.

As shown in FIG. 7, information region 710 contains program promotional information. Since information region 710 is interactive with the user, the user may click on information region 710 to get further information about the programs shown in the region. The user may further click on information region 710 to tune to the program if it is currently on, or the user may schedule an autotune to the program when it comes on. When autotune is scheduled, the system may or may not notify the user before automatically tuning to the program when the program comes on. Preferably, the system will request confirmation from the user before automatically tuning to the program. Finally, the user may schedule a recording of a future program or begin recording of a program currently on. As discussed, if the system requests confirmation from the user, additional information regions may be displayed while the user confirms his/her request.

Information region 715 may either be a static or scrolling message area that contains selected news or sports information. For example, the latest sports scores can scroll across information region 715. Although in the preferred embodiment, the type of information shown in information region 715 is determined by the system operator, it is also possible to allow the user to select the type of information to be shown in information region 715.

Figure 8:
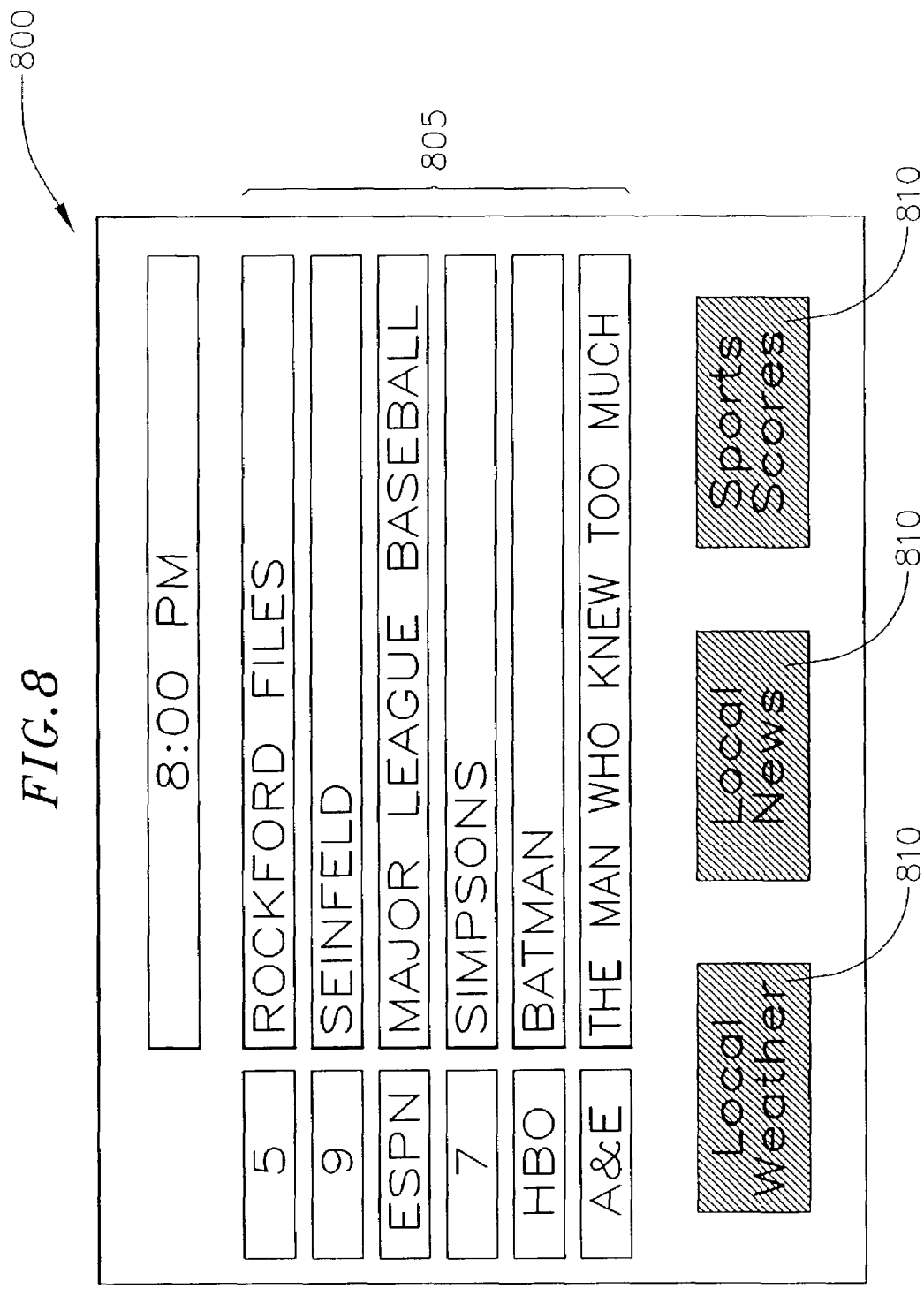
FIG. 8 is an illustration of an alternate embodiment of the program schedule guide screen which includes information icons.

FIG. 8 is an illustration of a program guide screen 800. Screen 800 contains a program schedule portion 805 similar in nature to the schedule guides previously described. In addition, screen 800 contains several information icons 810. Icons 810 can represent local or national weather forecasts, local or national news, sports news, sports scores, financial news, and the like. In response to the user selecting one of icons 810, screen 800 may be replaced with one or more additional information screens. For example, the weather information screen may display the current weather conditions or weather predictions for a plurality of regions. The sports score information screen may have icons or regions to represent each of a plurality of sports. A user may click on the individual icons or regions to view another screen dedicated to a single sport, or the sports score information screen may display the scores for different sports and sports teams on the same screen. The financial news information screen may likewise have icons or regions that the user may click on to choose other screens dedicated to specific financial markets. Alternatively, the financial news information screen may combine and display the financial markets on one screen.

Figure 9A:
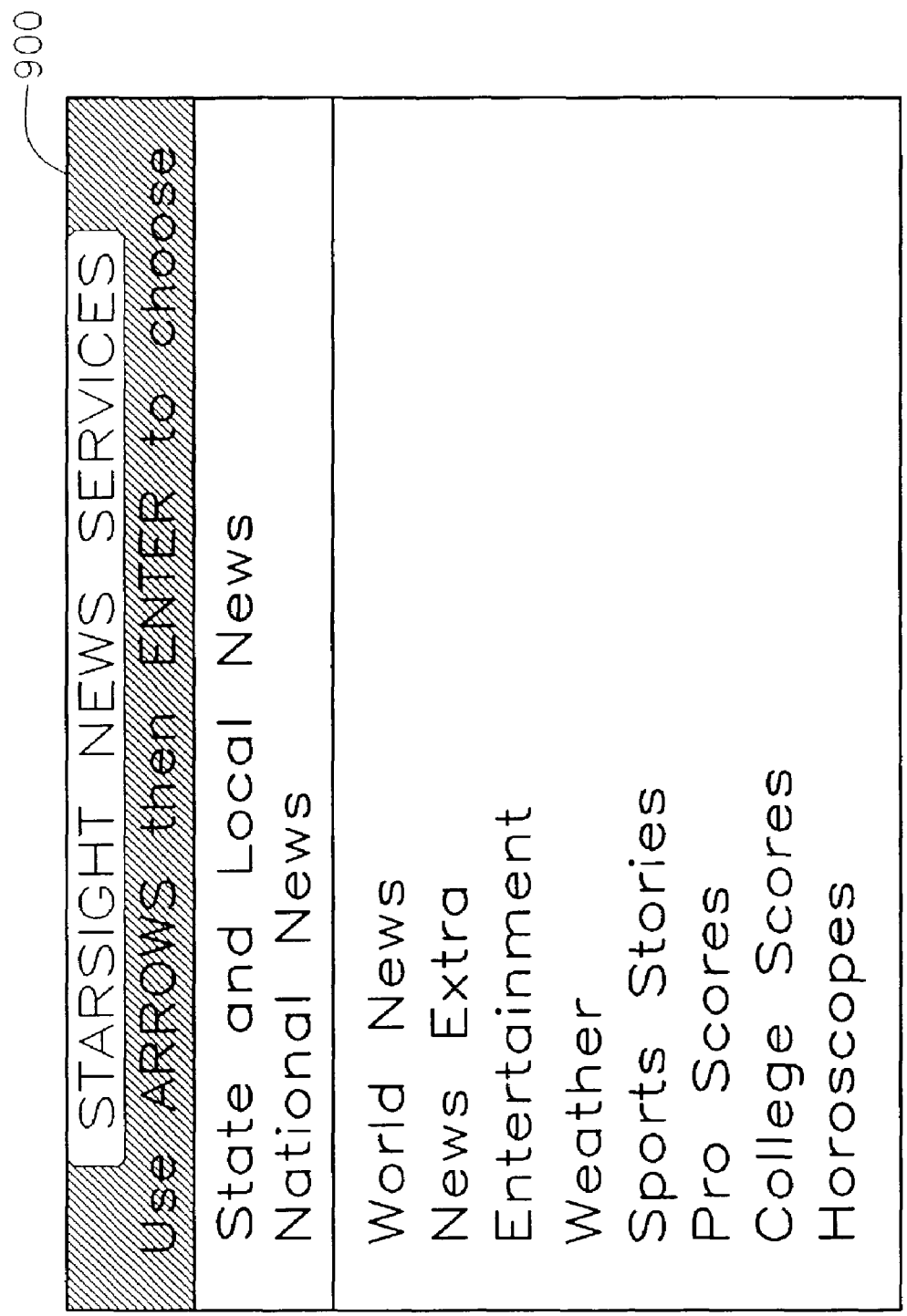
FIG. 9(a) is an illustration of an embodiment of the information guide.
Figure 9B:
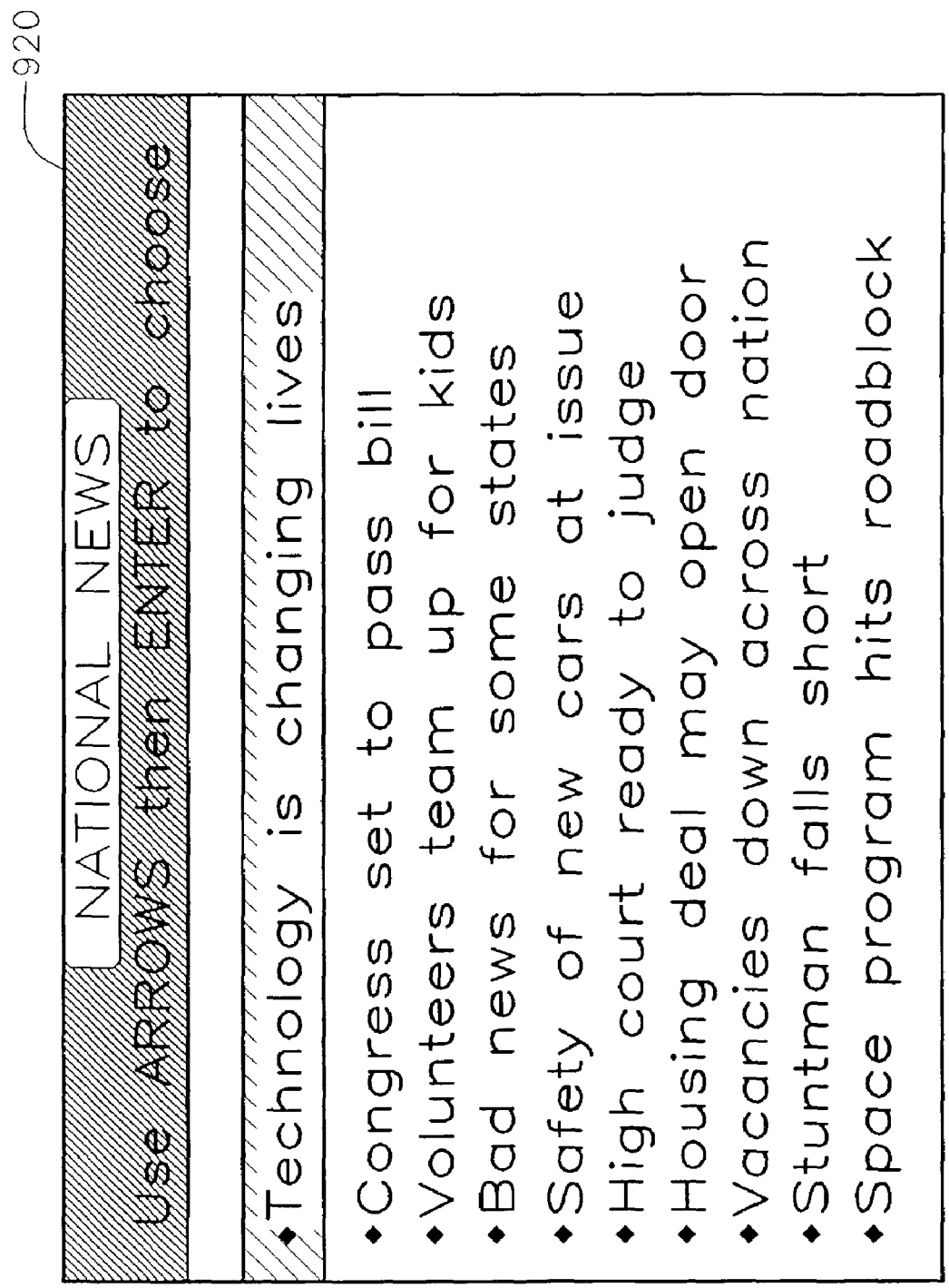
FIG. 9(b) is an illustration of a submenu of the information guide with news highlighted.
Figure 9C:
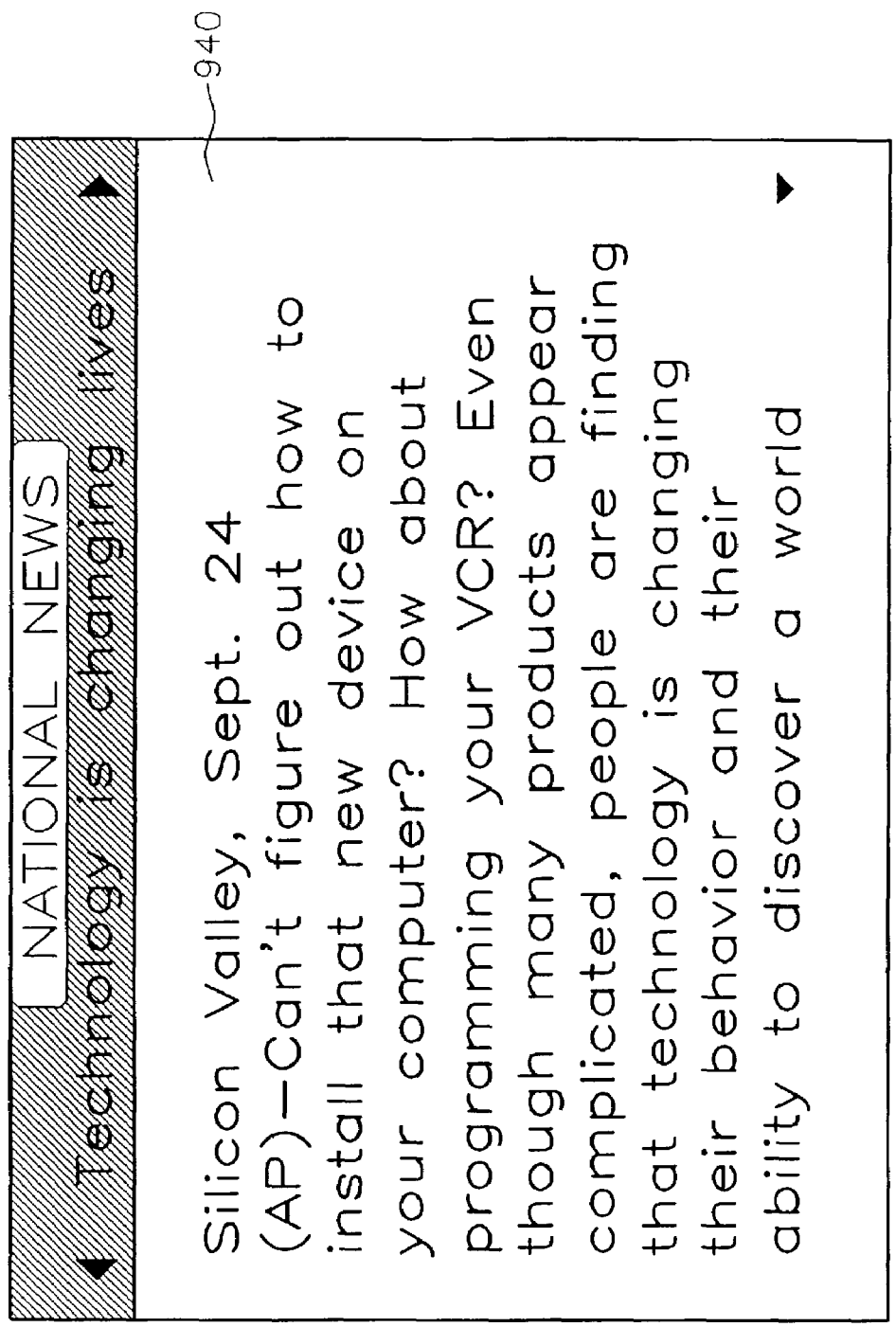
FIG. 9(c) is an illustration of a news information screen.

FIG. 9(*a*) is an illustration of an information guide screen 900. As shown, information guide screen 900 contains news, weather, sports, and horoscope information, however, other types of information may also be shown by information guide screen 900. As discussed, in an alternate embodiment, an information guide may be provided in addition to the program guide. The information guide may be connected to the program guide, or it may be a separate program. Since the information guide contains news, weather, sports, and other information, it may replace the information icons on the program guide, thereby allowing the program guide screen to show the user more program information.

In FIG. 9(*a*), the user has selected "National News." FIG. 9(*b*) is an illustration of a submenu 920 of information guide screen 900. As can be seen, submenu 920 further breaks "National News" down into the different headlines. In a preferred embodiment, the user may tune to CNN or other Network News Station from submenu 920. The system operator may charge a fee for this service, and may allow the user to tune to one or more Network News Station depending on the fees paid by the Network News Providers. Hence, CNN, for example, may pay a premium fee to be the only News Station that the user may connect to from submenu 920. Alternatively, CNN may pay a regular fee, and the user may tune to CNN, and other News Stations that have paid the regular fee.

From submenu 920, the user may highlight one of the headlines to select the headline and obtain the story. In this example, the story is displayed according to FIG. 9(*c*) in a news information screen 940. Alternatively, the user may click on a video icon (not shown) on screen 940 to further view a video clip relating to the story. The system may access the video clip via the video network, i.e., via cable, direct broadcast satellite, and the like. The video clip could be generated from compressed data, and if so, it may be presented in a PIP tickler format. Alternatively, the system may link to, for example, CNN's website, and retrieve an Audio-Video-Interleaved (AVI) file to present a moving picture related to the headline to the user. The video icon may also be available from submenu screen 920. Hence the user may click on the icon to view a video clip of the headline directly instead of reading the story. In another preferred embodiment, the system may automatically activate a video clip corresponding to whichever news headline that the user has selected, thereby eliminating the need for the user to activate an icon in order to view the video clip.

Figure 10A:
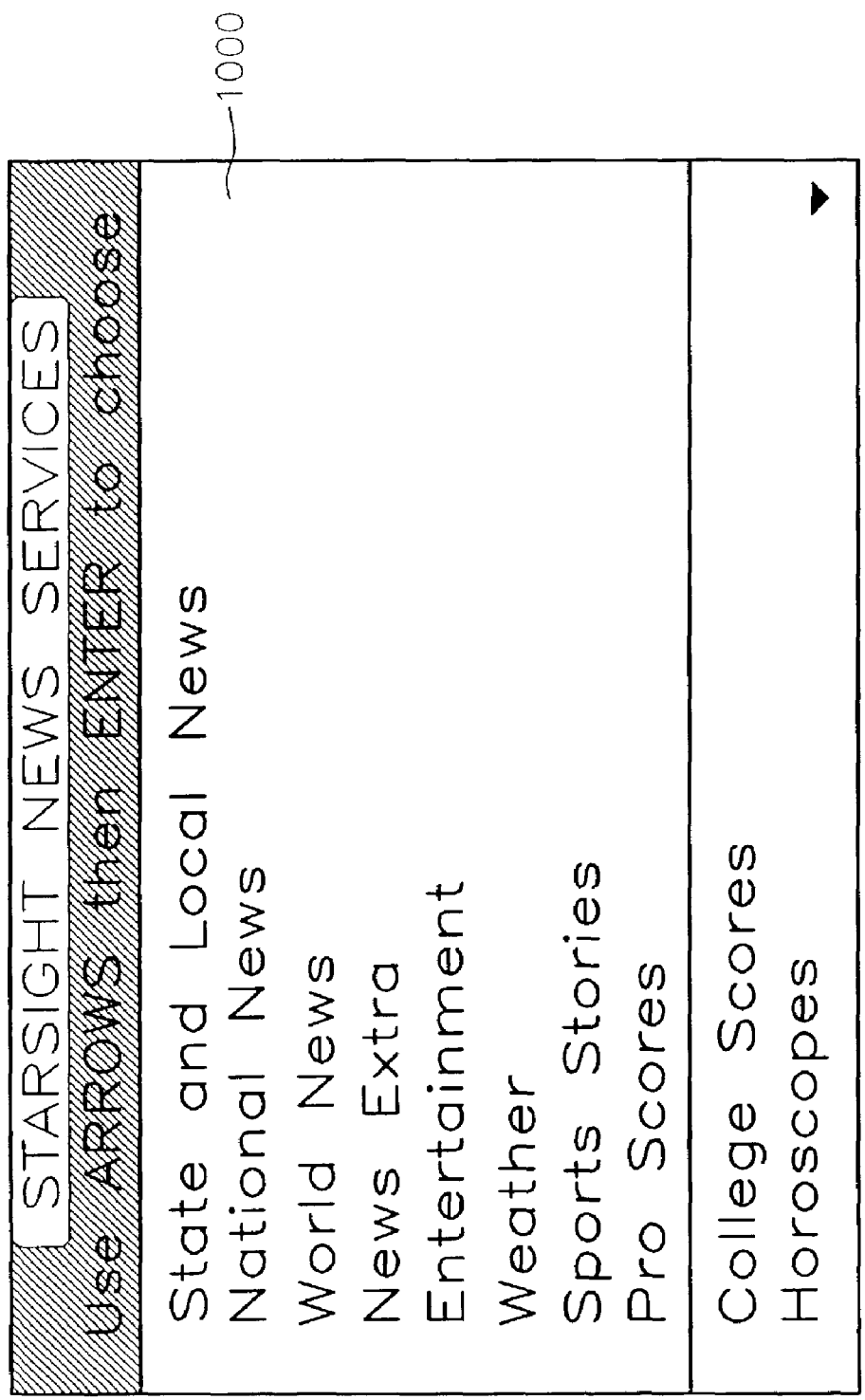
FIG. 10(a) is an illustration of an alternate embodiment of a submenu of the information guide with sports highlighted.
Figure 11A:
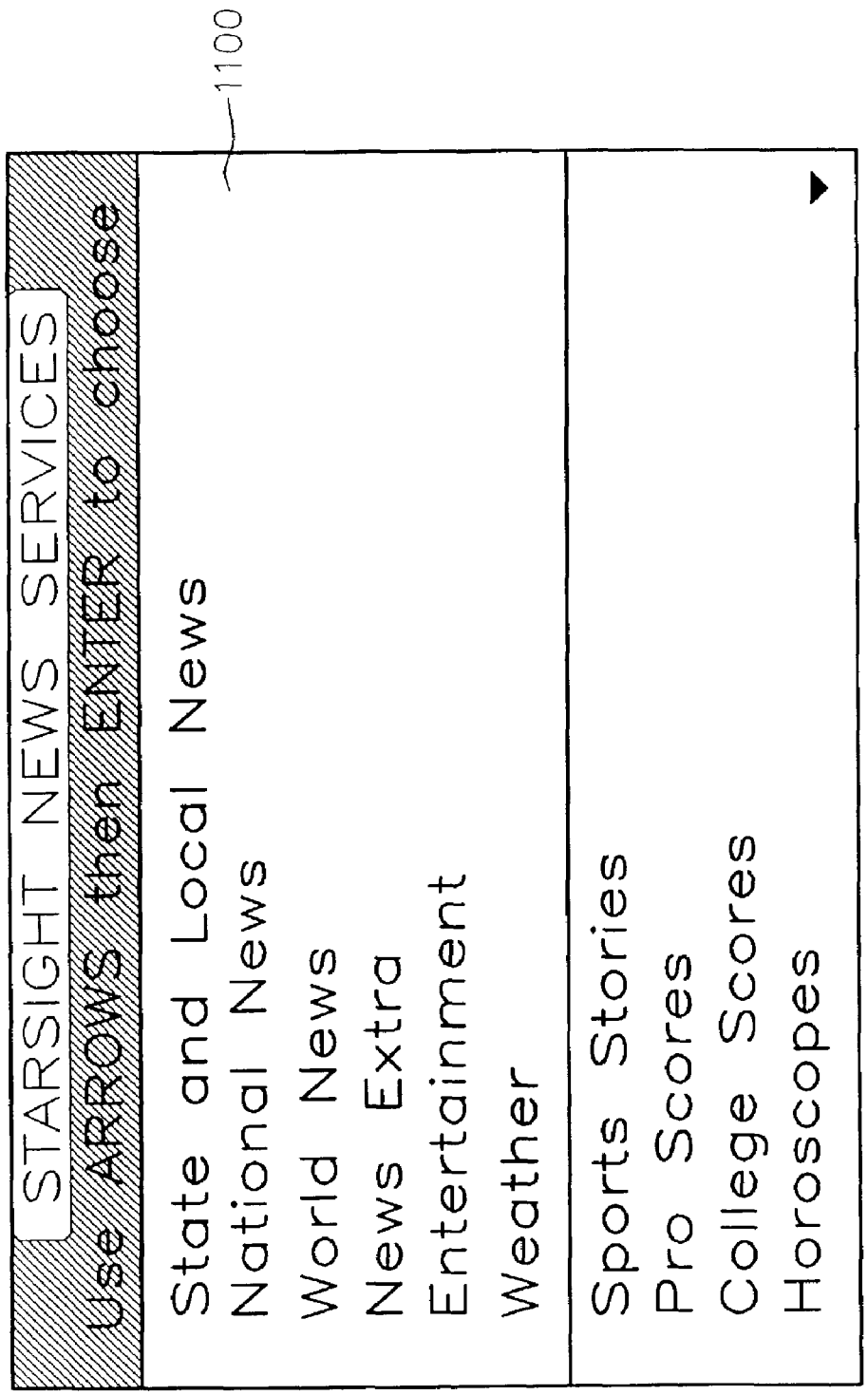
FIG. 11(a) is an illustration of an alternate embodiment of the information screen with weather highlighted.
Figure 11C:
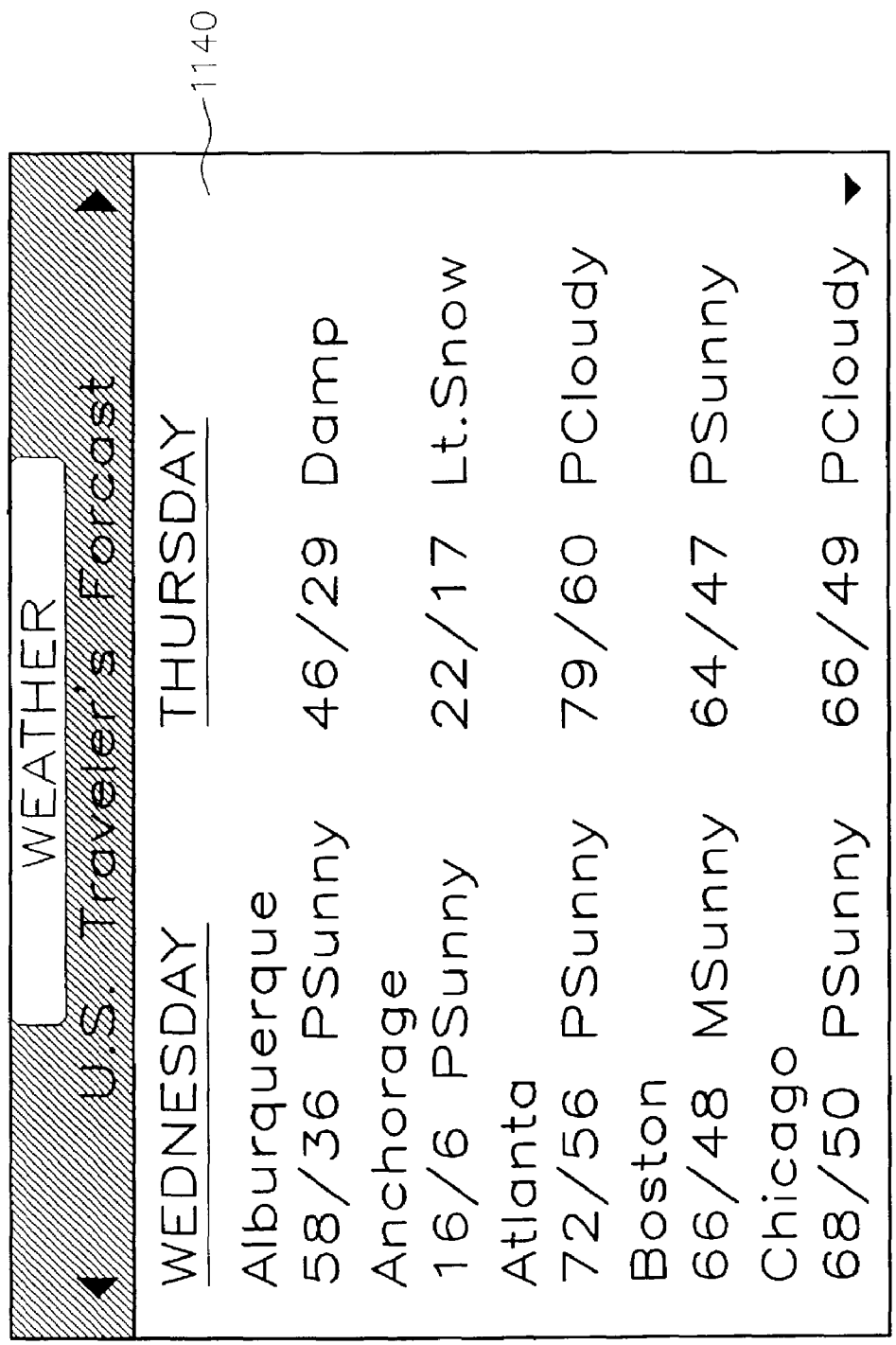
FIG. 11(c) is an illustration of a weather information screen.
Figure 11D:
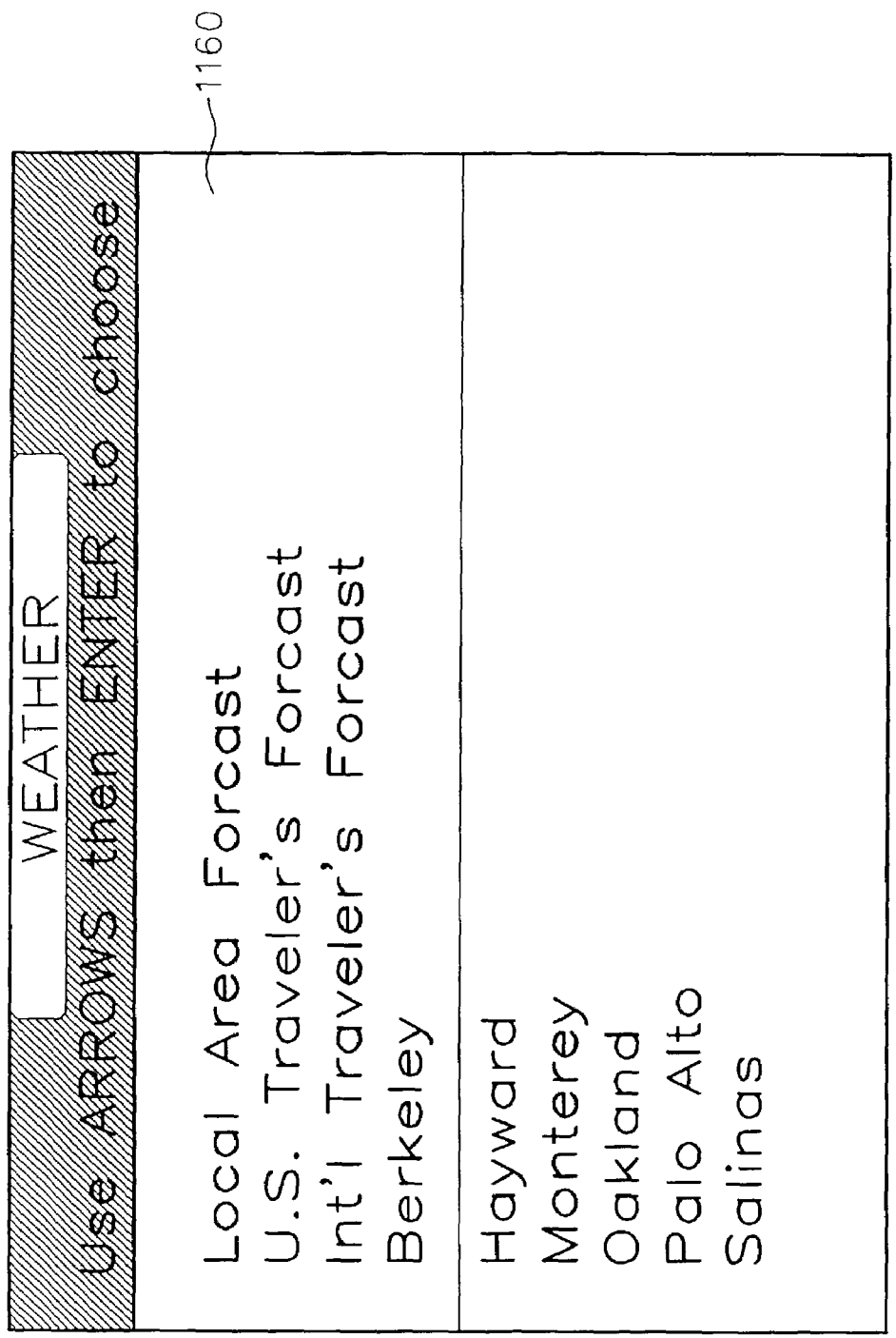
FIG. 11(d) is an illustration of an alternate embodiment of the weather submenu.
Figure 11E:
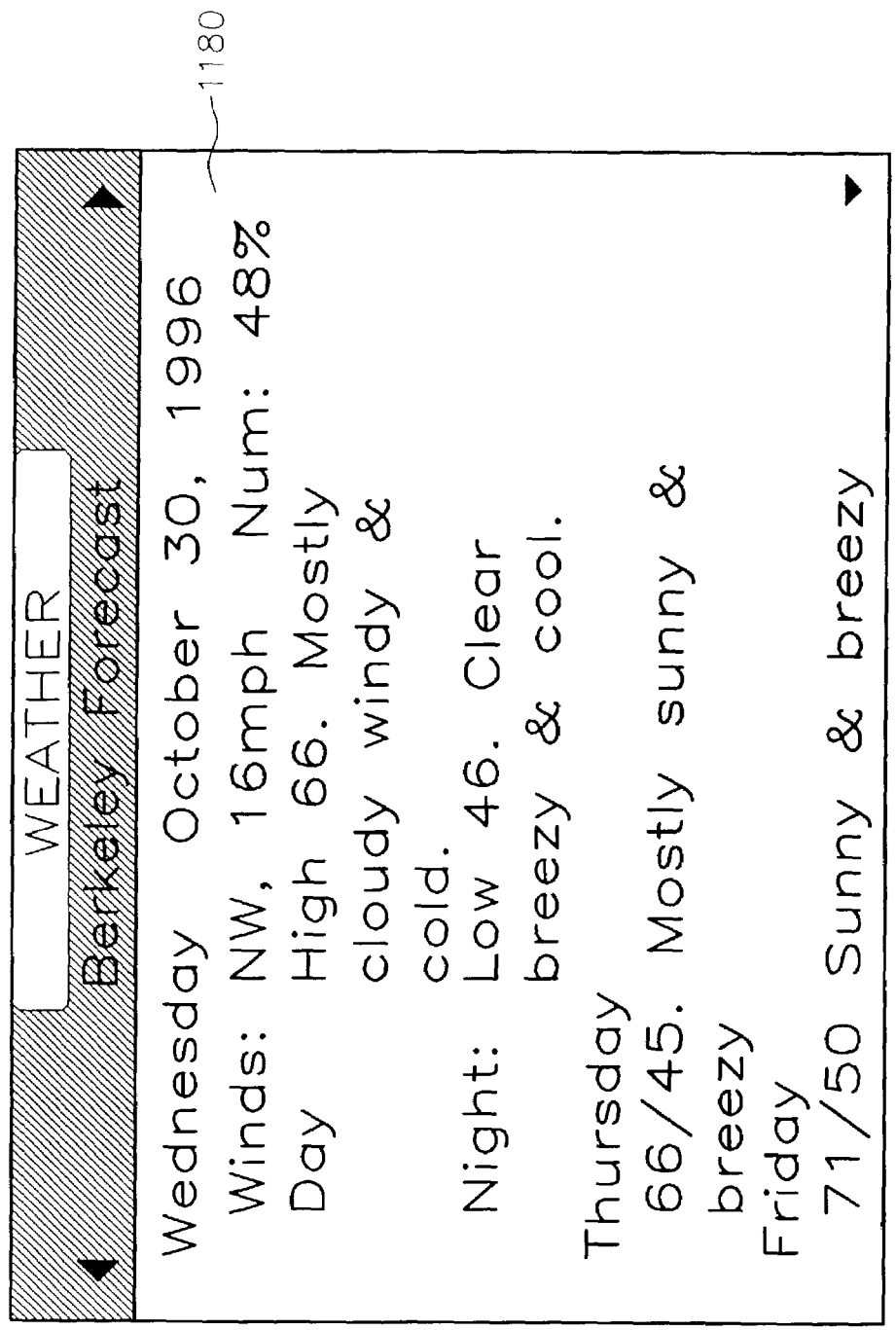
FIG. 11(e) is an illustration of an alternate embodiment of a weather information screen.

FIG. 10(*a*) is an illustration of a information guide screen 1000 that is similar to information guide screen 900 except in FIG. 10(*a*), the user has selected "Pro Scores" instead of "National News." FIG. 10(*b*) is an illustration of a submenu 1020, which further breaks down "Pro Scores" into the different scoreboards. In a preferred embodiment, similar to the news submenu 920, the user may tune to ESPN or other Sports Station from sports submenu 1020. The system operator may also charge a fee for this service, and may allow the user to tune to one or more Sports Station depending on the fees paid by the Providers. Hence, ESPN may also, for example, pay a premium fee to be the only Sports Station that the user may connect to from submenu 1020. Alternatively, ESPN may pay a regular fee, and the user may tune to ESPN, and other Sports Stations that have also paid the regular fee.

From submenu 1020, the user may highlight one of the scoreboards to select the scoreboard and obtain scores pertaining to the board. In this example, the scores are displayed according to FIG. 10(*c*) in a sports information screen 1040. As shown in screen 1040, the scores are presented in grid format. Other arrangements may of course be used, so long as the information is presented in a logical fashion. From information screen 1040, the user may also click on a video icon (not shown) to further view a video clip relating to the game. As discussed, the system may access the video clip via the video network, i.e., via cable, direct broadcast satellite, and the like, and this video clip could be generated from compressed data. Alternatively, the system may link to, for example, the NFL's website, and retrieve an AVI file, if it is available, to present a moving picture related to the game to the user.

FIG. 11 (*a*) is an illustration of a information guide screen 1100 that is also similar to information guide screen 900 except in FIG. 11 (*a*), the user has selected "Weather" instead of "National News." FIG. 11 (*b*) is an illustration of a submenu 1120, which further breaks down "Weather" into weather forecasts for the different geographic regions. The system displays different local weather forecasts depending on the location of the user. In the example as shown in FIG. 11(*b*), the user is located in California, along the East Bay; hence, the local weather forecasts are for the different East Bay cities. In another embodiment, the user may specify the geographic region. Hence, the user may obtain also weather information for regions other than where the user is located.

In FIG. 11(*b*), the user has selected weather forecast for the United States, hence, the user may be shown a U.S. weather information screen 1140 (FIG. 11(*c*)), which displays the information in a column fashion. Other display arrangements that displays the information in a logical manner may also be used; furthermore, the information may be more detailed than that shown in information screen 1140. FIG. 11(*d*) is an illustration of a submenu 1160 that is similar to submenu 1120 except in FIG. 11(*d*), the user has selected weather forecast for Berkeley, instead of for the U.S. Hence, the user is shown a forecast of Berkeley weather in a information screen 1180 (FIG. 11(*e*)) instead. Since the weather information is for a local region, it is more detailed and provides more information to the user. As shown in FIG. 11(*e*), the weather information is displayed in a row fashion. Again, other arrangements for presenting the weather information may also be used as long as the information is organized in a logical manner.

Figure 12:
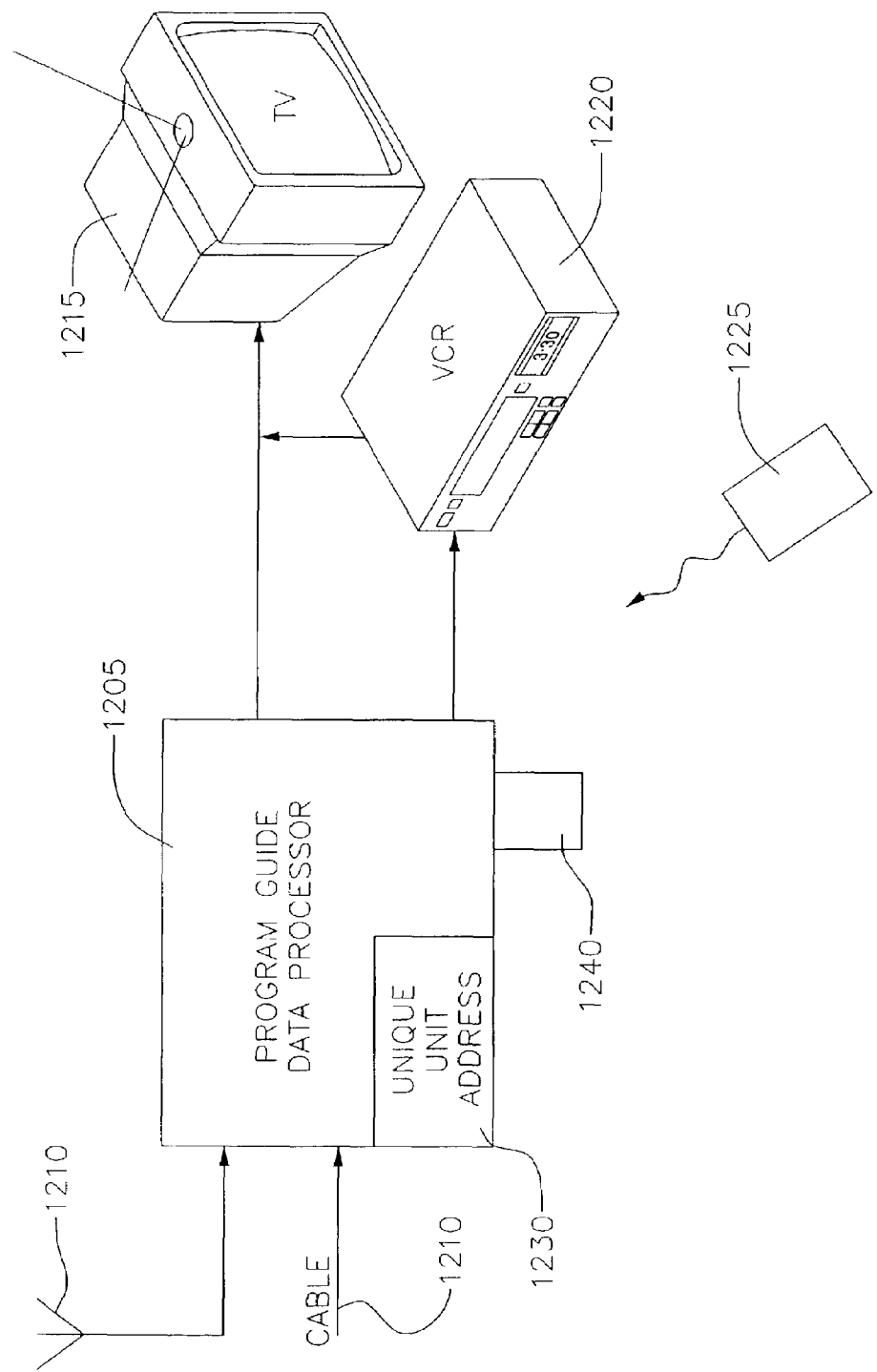
FIG. 12 illustrates the hardware elements of a preferred embodiment of the invention.

FIG. 12 illustrates the hardware elements of one particular embodiment of the invention. As shown, the configuration preferably utilizes a program guide controller 1205 (for example, a data processor), one or more televisions sources 1210, and a TV or computer monitor 1215. These systems may also include a VCR 1220 and a remote control 1225. Program guide system 1205 may be a stand-alone device or it may be incorporated into another system such as a television, a cable decoder, a computer, a PCTV, or a VCR. As shown, program guide system 1205 has a unit address 1230 that is unique to each system. Hence, the system operators may identify system 1205 according to its unique unit address thereby enabling the system operators to send messages to specific users.

Another embodiment of the present invention includes a plug-in program guide controller module 1240. Module 1240 determines the extent of program guide 1205's capabilities. Thus module 1240 may only allow program guide 1205 to provide a non-interactive guide or the guide may not have information icons. When the user wants to upgrade program guide 1205, for example, adding interactive capability, information icons, or more detailed category searching, module 1240 may be replaced with a different module authorizing more extensive guide capabilities. This embodiment has the distinct advantage of allowing the system to be significantly altered without requiring major hardware changes. Since the user upgrades module 1240 to upgrade the guide, the user does not need the system operator to provide technical support. In this scenario the user would merely procure a different module 1240, install the new module into the program guide system 1205, and pay the new fee set by the system operator for the new benefits.

Preferably the system operates under the control of software applications on a renewable computer memory. The memory for the software applications may be located in one or more ICs, for example, the plug-in module of the data processor, or in ROM, RAM, FLASH memory or any combination thereof. Accordingly, the disclosures and descriptions herein are intended to be illustrative, but not limiting, of the scope of the invention which is set forth in the following claims.

What is claimed is:

1. A method of displaying an advertisement in an interactive electronic program guide (IPG) comprising:
    displaying, in a first area of the display, a first television program listing corresponding to a first television program and a second television program listing corresponding to a second television program;
    displaying advertisement information in an interactive advertisement region next to the first area, wherein the displayed advertisement information changes from a first advertisement to a second advertisement as a cursor is moved by a user from the first television program listing to the second television program listing, wherein the second advertisement, displayed while the cursor is positioned over the second television program listing, corresponds to a television program other than the second television program;
    positioning the cursor over the advertisement region and receiving a user selection of the advertisement region over which the cursor is positioned; and
    providing, responsive to the user selection of the advertisement region, a display of information about the television program being advertised in the advertisement region, said display including a tune option that allows the user to tune to the television program being advertised without recording the television program and a record option that allows the user to record the television program being advertised.

2. The method of claim 1 further comprising connecting to a product supplier and ordering a product.

3. The method of claim 1, wherein the providing the display including the tune option further comprising allowing the user to schedule an autotuning to an infomercial being advertised in the advertisement region.

4. The method of claim 1, wherein the providing the display including the record option further comprises allowing the user to record an infomercial being advertised in the advertisement region.

5. The method of claim 1, wherein the providing the display including the tune option further comprising allowing the user to tune to an infomercial being advertised in the advertisement region.

6. The method of claim 1, further comprising displaying an icon allowing the user to obtain more information about a product advertised in the advertisement region when the icon is selected.

7. The method of claim 1, wherein the displaying the advertisement information further comprises displaying the advertisement information about a pay-per-view program.

8. The method of claim 1, wherein the displaying the advertisement information further comprises displaying the advertisement information about a future television program.

9. The method of claim 1, wherein the displaying the advertisement information further comprises displaying the advertisement information about a merchandise.

10. The method of claim 1, wherein the displaying the advertisement information further comprises displaying the advertisement information promoting a website.

11. The method of claim 10 further comprises accessing the website and displaying data from the website.

12. The method of claim 11 further comprises displaying in a second area the data from the website at the same time a television program that the user was viewing before accessing the website is displayed in a third area.

13. The method of claim 1, wherein the displaying the advertisement information further comprises displaying advertisement information only during the times when the user is more likely to be watching the IPG.

14. The method of claim 1, wherein the displaying the advertisement information further comprises displaying animation.

15. The method of claim 1, wherein the displaying the advertisement information further comprises displaying a video clip about the television program.

16. An interactive electronic program guide (IPG) system comprising:
    a display monitor;
    a storage medium for storing information about a plurality of television program listings;
    a display processor for displaying, in a first area of the display, a first television program listing corresponding to a first television program and a second television program listing corresponding to a second television program;
    means for displaying advertisement information in interactive advertisement region next to the first area, wherein the displayed advertisement information changes from a first advertisement to a second advertisement as a cursor is moved by a user from the first television program listing to the second television program listing, wherein the second advertisement, displayed while the cursor is positioned over the second television program listing, corresponds to a television program other than the second television program;
    means for positioning the cursor over the advertisement region and receiving a user selection of the advertisement region over which the cursor is positioned; and
    means for providing, responsive to the user selection of the advertisement region, a display of information about the television program being advertised in the advertisement region, said display including a tune option that allows the user to tune to the television program being advertised without recording the television program being advertised and a record option that allows the user to record the television program being advertised.

17. The IPG system of claim 16 further comprising means for connecting to a product supplier and ordering a product.

18. The IPG system of claim 16, wherein the means for providing the display including the tune option further comprises means for allowing the user to schedule an autotuning to an infomercial being advertised in the advertisement region.

19. The IPG system of claim 16, wherein the means for providing the display including the tune option further comprises means for allowing the user to record an infomercial being advertised in the advertisement region.

20. The IPG system of claim 16, wherein the means for providing the display including the tune portion comprises means for allowing the user to tune to an infomercial being advertised in the advertisement region.

21. The IPG system of claim 16, further comprising means for displaying an icon allowing the user to obtain more information about a product advertised in the advertisement region when the icon is selected.

22. The IPG system of claim 16, wherein the advertisement is about a pay-per-view program.

23. The IPG system of claim 16, wherein the advertisement is about a future television program.

24. The IPG system of claim 16, further comprising means for displaying advertisement information about a merchandise.

25. The IPG system of claim 16, further comprising means for displaying advertisement information promoting a website.

26. The IPG system of claim 25 further comprising means for accessing the website and displaying data form the website.

27. The IPG system of claim 26 further comprising means for displaying in a second area the data from the website at the same time a television program that the user was viewing before accessing the website is displayed in a third area.

28. The IPG system of claim 16, wherein the advertisement information is displayed only during the times when the user is more likely to be watching the IPG.

29. The IPG system of claim 16, wherein the advertisement information comprises animation.

30. The IPG system of claim 16, wherein the advertisement comprises a video clip about the television program.

31. A method of displaying an advertisement in an interactive electronic program guide (IPG) comprising:
    displaying, in a first area of the display, a first television program listing corresponding to a first television program, where a cursor is positioned over the first television program listing;
    displaying promotional information in a region next to the first area;
    displaying an advertisement in an interactive advertisement region different from the promotional information region, wherein the advertisement is displayed simultaneously with both the first television program listing and the promotional information, and wherein the advertisement, displayed while the cursor is positioned over the first television program listing, corresponds to a television program other than the first television program;
    positioning the cursor over the advertisement region and receiving a user selection of the advertisement region over which the cursor is positioned; and
    providing, responsive to the user selection of the advertisement region, a display of information about the television program being advertised in the advertisement region, said display including a tune option that allows the user to tune to the television program being advertised without recording the television program and a record option that allows the user to record the television program being advertised.

32. The method of claim 31 further comprising changing the advertisement as a cursor is moved by the user to a second television program listing corresponding to a second television program.

33. The method of claim 31, further comprising displaying an icon allowing the user to obtain more information about a product advertised in the advertisement region when the icon is selected.

34. The method of claim 31, wherein the displaying the advertisement further comprises displaying an advertisement about a pay-per-view program.

35. The method of claim 31, wherein the displaying the advertisement further comprises displaying an advertisement about a future television program.

36. The method of claim 31, wherein the displaying the advertisement information further comprises displaying advertisement information about a merchandise.

37. The method of claim 31 further comprising accessing a website and ordering a product form the website.

38. An interactive electronic program guide (IPG) system comprising:
    means for displaying, in a first area of the display, a television program listing corresponding to a first television program, where a cursor is positioned over the first television program listing;
    means for displaying promotional information in a region next to the first area;
    means for displaying an advertisement in an interactive advertisement region different form the promotional information region, wherein the advertisement is displayed simultaneously with both the first television program listing and the promotional information, and wherein the advertisement, displayed while the cursor is positioned over the first television program listing, corresponds to a television program other than the first television program;
    means for positioning the cursor over the advertisement region and receiving a user selection of the advertisement region over which the cursor is positioned; and
    means for providing, responsive to the user selection of the advertisement region, a display of information about the television program being advertised in the advertisement region, said display including a tune option that allows the user to tune to the television program being advertised without recording the television program and a record option that allows the user to record the television program being advertised.

39. The IPG system of claim 38 further comprising means for connecting to a product supplier and ordering a product.

40. The IPG system of claim 38, wherein the means for providing the display including the tune option further comprises means for allowing the user to schedule an autotuning to an infomercial being advertised in the advertisement region.

41. The IPG system of claim 38 wherein the means for providing the display including the record option further comprises means for allowing the user to record an infomercial being advertised in the advertisement region.

* * * * *